(12) United States Patent
Nieves et al.

(10) Patent No.: US 9,291,787 B2
(45) Date of Patent: Mar. 22, 2016

(54) INTEGRATED DISTRIBUTION ENABLING ACCESS APPARATUS

(71) Applicant: AFL Telecommunications LLC, Duncan, SC (US)

(72) Inventors: Anthony Nieves, Fountain Inn, SC (US); Wilfred Courchaine, Moore, SC (US); Kheng Hwa Seng, Greer, SC (US); Matthew Johnson, Greenville, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 14/463,072

(22) Filed: Aug. 19, 2014

(65) Prior Publication Data

US 2014/0355945 A1    Dec. 4, 2014

Related U.S. Application Data

(63) Continuation of application No. 13/130,708, filed as application No. PCT/US2011/022594 on Jan. 26, 2011, now Pat. No. 8,886,003.

(60) Provisional application No. 61/298,240, filed on Jan. 26, 2010.

(51) Int. Cl.
*G02B 6/00* (2006.01)
*G02B 6/255* (2006.01)
*G02B 6/44* (2006.01)

(52) U.S. Cl.
CPC ............ *G02B 6/4452* (2013.01); *G02B 6/4454* (2013.01); *G02B 6/4442* (2013.01); *G02B 6/4446* (2013.01); *G02B 6/4455* (2013.01)

(58) Field of Classification Search
CPC .. G02B 6/4452; G02B 6/4453; G02B 6/4454; G02B 6/4439; G02B 6/4441; G02B 6/4455; G02B 6/4446; G02B 6/4442; G02B 6/4447
USPC ............................. 385/96–99, 134, 135, 136
See application file for complete search history.

(56) References Cited

U.S. PATENT DOCUMENTS

| | | | | |
|---|---|---|---|---|
| 5,109,467 | A | * | 4/1992 | Hogan et al. .................. 385/135 |
| 6,788,871 | B2 | * | 9/2004 | Taylor ............................ 385/135 |
| 6,802,724 | B1 | | 10/2004 | Mahony |

(Continued)

OTHER PUBLICATIONS

Internatinoal Search Report for International Application No. PCT/US2011/022594 dated Mar. 25, 2011.

*Primary Examiner* — Kaveh C Kianni
*Assistant Examiner* — Hung Lam
(74) *Attorney, Agent, or Firm* — Sughrue Mion, PLLC

(57) ABSTRACT

Provided is an apparatus including: a housing having a splitter compartment; a multiple fiber adapter attached to an exterior of a front housing wall of said housing; a multiple fiber connector connected to said multiple fiber adapter and disposed in an interior of the front housing wall of said housing; an optical splitter in said splitter compartment of said housing; an input fiber optically connected to said optical splitter; and a plurality of output fibers optically connected to said optical splitter and said multiple fiber connector, wherein the housing includes a hinge plate corresponding to a bottom housing wall perpendicular to the front housing wall of said housing in a closed state and mounted on a hinge affixed to said housing at an intersection between the bottom housing wall and a rear housing wall opposite from the front housing wall.

6 Claims, 34 Drawing Sheets

(56) References Cited

U.S. PATENT DOCUMENTS

| | | |
|---|---|---|
| 7,062,042 B1 | 6/2006 | Gilbert |
| 2006/0263029 A1 | 11/2006 | Mudd et al. |
| 2007/0086721 A1 | 4/2007 | Dobbins et al. |
| 2008/0042535 A1 | 2/2008 | Guzzo et al. |
| 2008/0170833 A1 | 7/2008 | Castonguay et al. |
| 2010/0142910 A1* | 6/2010 | Hill et al. ............... 385/135 |
| 2011/0268415 A1* | 11/2011 | Fabrykowski et al. ........ 385/135 |

\* cited by examiner

INTEGRATED DISTRIBUTION ENABLING ACCESS APPARATUS

CROSS-REFERENCE TO RELATED APPLICATIONS

This application is a continuation application of U.S. patent application Ser. No. 13/130,708, filed on May 23, 2013, which claims the benefit of priority from U.S. Provisional Application No. 61/298,240, filed Jan. 26, 2010 and U.S. Provisional Application No. 61/390,302, filed Oct. 6, 2010, the disclosures of which is incorporated herein in their entirety by reference.

BACKGROUND OF THE INVENTION

1. Field of the Invention

The invention relates to an apparatus for distributing fiber optic signals from a provider to a plurality of subscribers or end users.

2. Background

Since the end of the 20th century, passive optical network (PON) architecture has gained worldwide acceptance and now underlies much of the growth of the telecommunications industry. Today, however, PON architecture is undergoing a technological transformation that is driving it into the next generation.

PON is a point-to-multipoint architecture that is used to deliver fiber to the premises by distributing signals through unpowered optical splitters to a multitude of subscribers. On one end of the network, in the central office, an optical line terminal converts and packages electrical signals into an optical output. These signals are distributed over the optical network via a backbone cable, which links between the inside-plant and outside-plant environments. The packaged signal is distributed further into the network by means of an optical splitter, which divides the signal among several fibers, each of which goes to a different subscriber.

At the other end of the network, at the subscriber's premises, an optical network terminal or optical network unit provides a termination and separation point for the delivered optical signal. This piece of hardware converts the optical signal into electrically formatted subcomponents for delivery of telephone, television, and Internet service to end-user devices.

Most PON architectures are centered on distribution cabinets that house unpowered optical splitters and tie together the network. These cabinets are large, expensive and cumbersome, and usually require below-grade handholes for splicing fiber. Installing them requires, at a minimum, expensive excavation equipment and labor, and may also require obtaining permits for placement. Including labor and materials costs (cabinet, splitters, pigtails and so forth), the cost can easily exceed $15,000 for a fully loaded 288-fiber setup. Planning for the assembly and implementation of a distribution cabinet can also be a daunting task. Typically this installation requires several days of labor commitment as well as multiple installers.

From a business development and network design approach, placing the distribution cabinet requires mapping out a group of subscribers and ascertaining likely take rates. Because the fiber infrastructure is defined up front but the active customers are not known until services are marketed, there is a large amount of pressure on the provider to maximize capacity—which tends to increase the cost per customer.

This topology—a centralized distribution point in the middle of a fiber web—limits the flexibility of a traditional PON architecture. Not only does the distribution point require a large investment, but also its reach defines and limits the network's area of coverage.

Rural applications are not efficiently covered by this architecture; their lower subscriber densities require more fiber to cover a smaller customer base, which in turn significantly increases infrastructure costs. In urban layouts, the central distribution architecture is limited by its inability to effectively serve high-density regions. The typical 1×16 and 1×32 splitters with which central distribution cabinets are outfitted do not provide enough flexibility for a high-rise building that may contain hundreds of potential customers. Even in suburban housing developments, traditional PON architectures do not accommodate widely varied take rates in a cost-effective manner. In recent years, deployers have begun to demand ways to accommodate smaller housing developments without the large upfront financial commitment of a traditional distribution cabinet.

The project commitment associated with distribution cabinet deployment is burdensome to the overall design and construction of a PON, placing an unbalanced focus on penetration rates and break-even points in the life cycle and diverting attention from network setup. Fortunately, because of the push to cut installation costs and increase flexibility, new solutions have begun to emerge as alternatives to distribution cabinet deployment.

Current technology for distributing cable, Internet, data, etc., to subscribers/homes uses fiber distribution hubs (FDHs). An example of and FDH is disclosed in U.S. Pat. No. 7,200,317—Systems and Methods for Optical Fiber Distribution and Management. FDHs typically consist of a passive optical network (PON) cabinet located in an outside plant (OSP) or multiple dwelling unit (MDU) environment. The cabinet is usually a ruggedized metal cabinet with a product life of twenty years. The FDH also allows for passive upgrading of splitter modules and distribution of splitter module output fibers.

Examples of related technology includes the splitters disclosed in U.S. Pat. No. 7,218,828—Optical Fiber Power Splitter Module Apparatus and U.S. Pat. No. 7,515,805—Fiber Optic Splitter. The '828 patent is directed to and discloses a multi-fiber push on (MPO) based splitter module. The objective of the '828 patent was to eliminate all of the fiber pigtails emanating from the splitter housing that were conventional at the time, such as disclosed in the '828 patent. It did this by using connectors/adapters for the input fibers and all of the output fibers. However, a disadvantage of this solution is that is does not allow the flexibility to have the input fiber spliced directly to the splitter. Spliced connections provide a connection and have lower loss than connectorized connections.

Therefore, there is a need for an architecture that allows more flexible layouts, where distribution points can be placed anywhere in the network. Outside-plant designers can now distribute signals at a wider variety of locations between the central office and fiber network endpoints.

BRIEF SUMMARY OF THE INVENTION

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

A first embodiment of the invention is an apparatus with a housing with a splitter compartment and a splicer compartment, a multiple fiber adapter attached to a wall of the housing, a multiple fiber connector connected to the multiple fiber adapter, an optical splitter in the splitter compartment of the housing, an input fiber optically connected to the optical splitter, a plurality of output fibers optically connected to the optical splitter and the multiple fiber connector.

In another embodiment of the invention a longitudinal axis of the splitter that goes through an input end and an output end of the splitter and an axis that goes along a front wall of the apparatus form an angle of between 20 and 70 degrees.

Another embodiment of the invention includes a least one additional multiple fiber adapter attached to the wall of the housing, at least one additional multiple fiber connector connected to the at least one additional multiple fiber adapter, at least one additional optical splitter in the splitter compartment of the housing, at least one additional input fiber connected to the at least one additional optical splitter, and a plurality of output fibers optically connected to the at least one additional optical splitter and the at least one additional multiple fiber connector.

Another embodiment of the invention is an apparatus including a plurality of housings, wherein each housing has a splitter compartment and a splicer compartment, at least one multiple fiber adapter attached to a wall of the housings, at least one multiple fiber connector connected to each of the multiple fiber adapters, an optical splitter in each of the housings, an input fiber optically connected to each of the optical splitters, a plurality of output fibers optically connected to the optical splitters and the multiple fiber connectors.

Another embodiment of the invention is an apparatus including a plurality of housings, an optical splitter in one of the housings, at least one single fiber adapter attached to each of the housings, at least one single fiber connector connected to the single fiber adapters, an input fiber optically connected to the optical splitter, and a plurality of output fibers, each optically connected to the optical splitter and to a single fiber connector.

BRIEF DESCRIPTION OF THE DRAWINGS

The above and other objects, features and advantages of the invention will become more apparent by describing in detail exemplary embodiments thereof with reference to the attached drawings in which.

DETAILED DESCRIPTION OF EXEMPLARY EMBODIMENTS OF THE INVENTION

Exemplary embodiments of the invention will now be described below by reference to the attached Figures. The described exemplary embodiments are intended to assist the understanding of the invention, and are not intended to limit the scope of the invention in any way.

Figure 1:
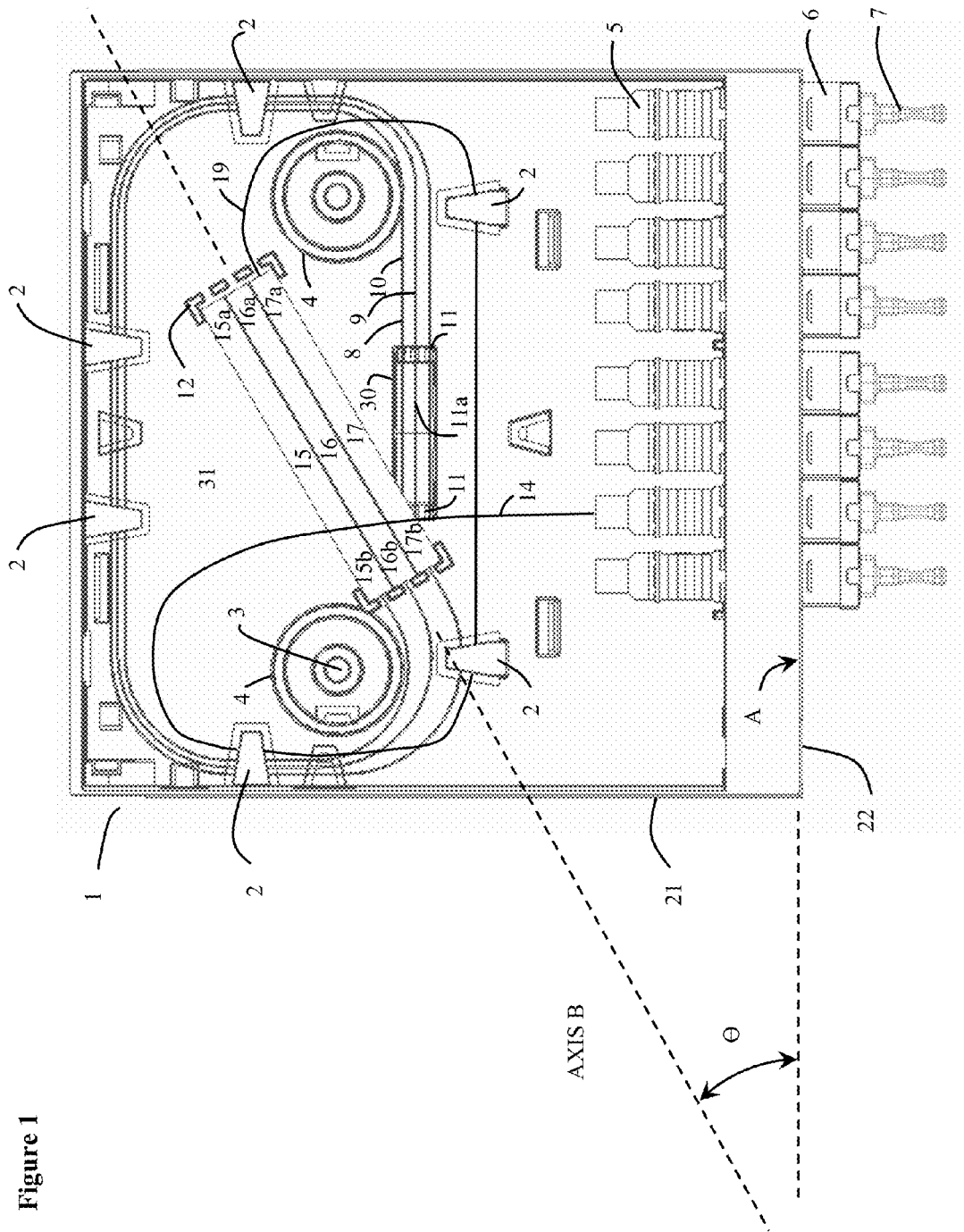
FIG. 1 shows a plan view of a first embodiment of a multiple fiber connector version of the invention.
Figure 2:
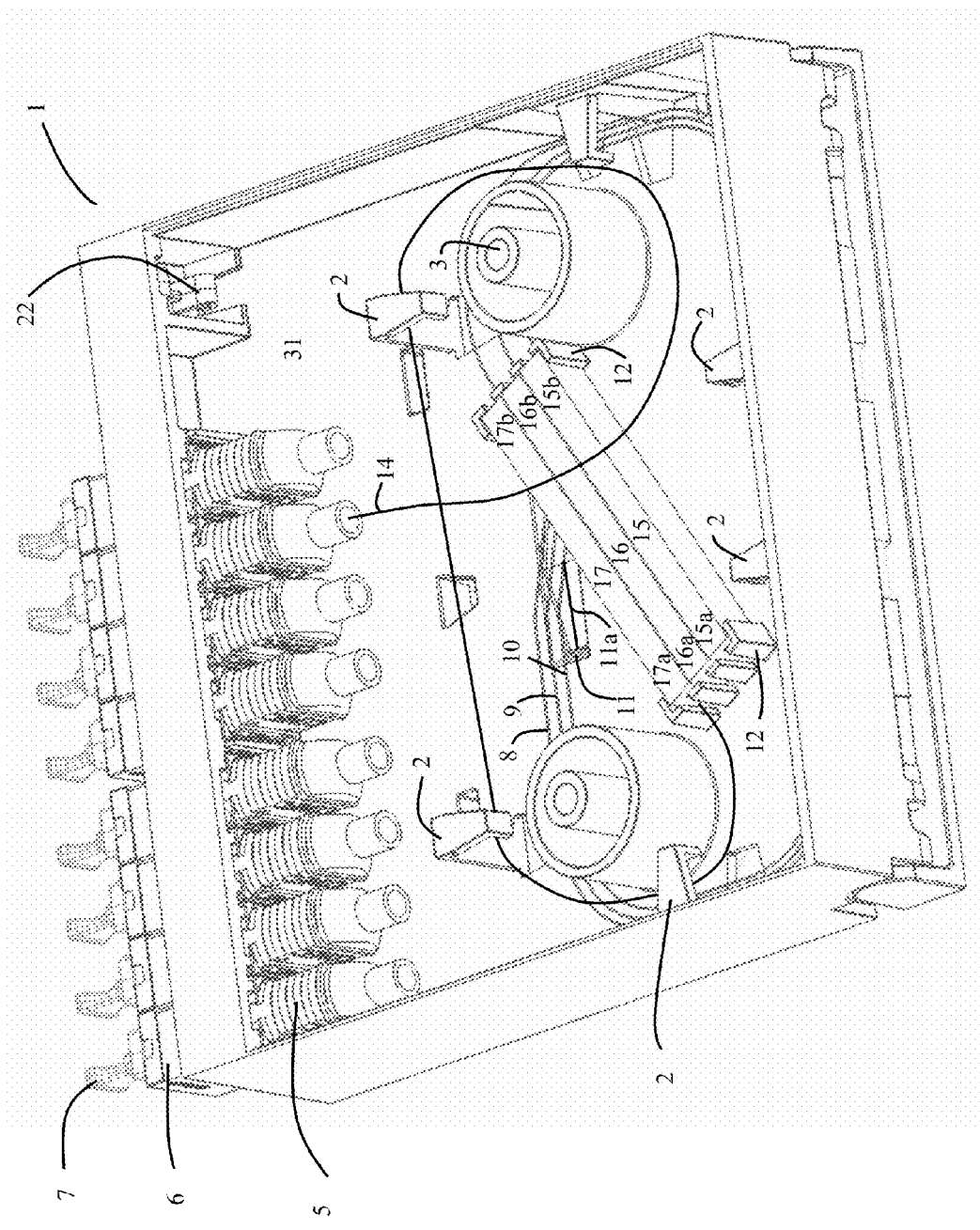
FIG. 2 shows an isometric view of a first embodiment of a multiple fiber connector version of the invention.
Figure 3:
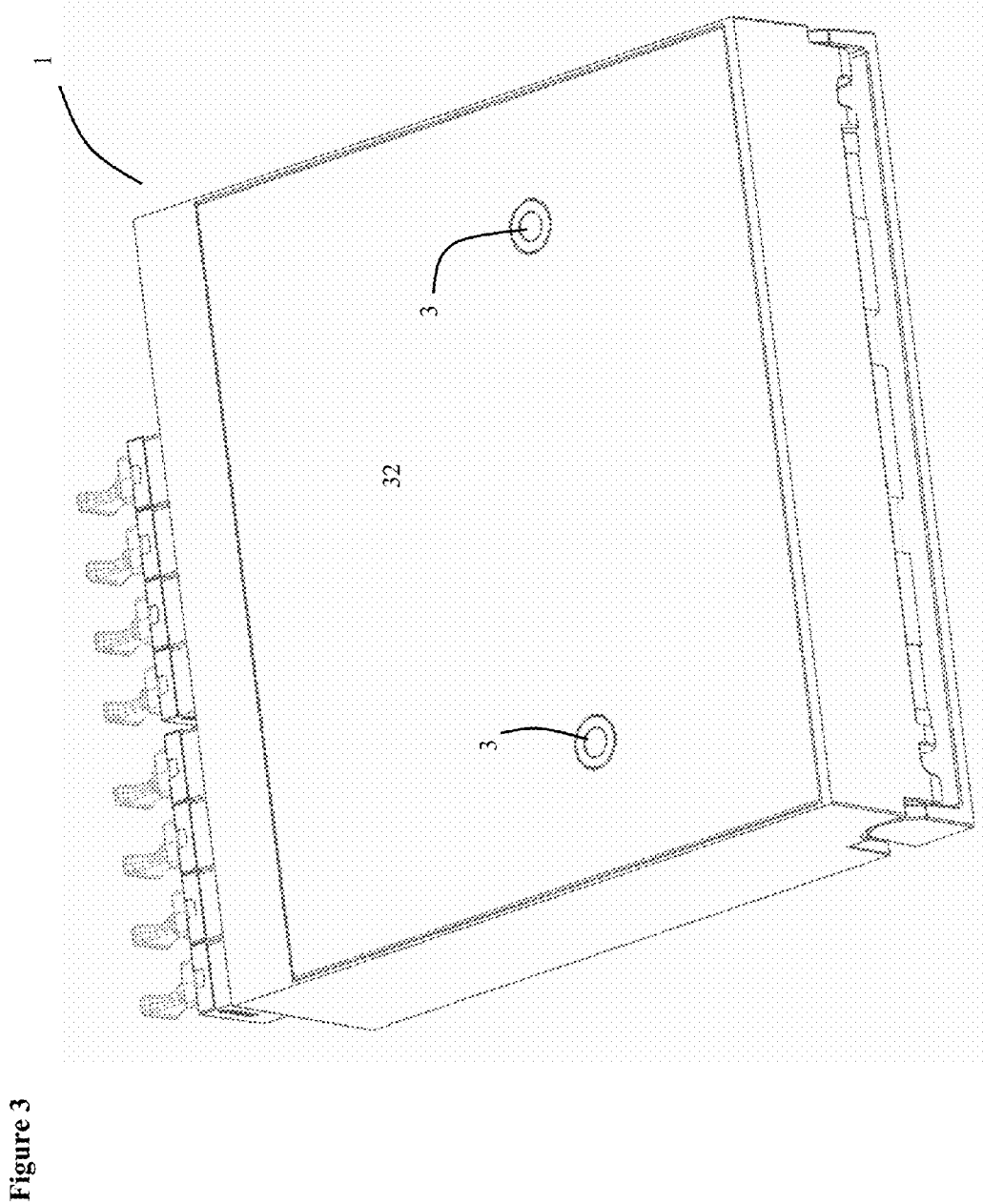
FIG. 3 shows another isometric view of a first embodiment of a multiple fiber connector version of the invention.

FIGS. 1 and 2 show plan and isometric views, respectively, of a first embodiment of a multiple fiber connector version of the integrated distribution enabling access apparatus 1 (the splitter compartment cover is not shown, however, it is shown in FIG. 3). An advantage of the multiple fiber connector version is that is offers the smallest footprint package. This particular embodiment is a 3×96 splitter apparatus. FIGS. 1 and 2 show the splitter compartment 31 side of the apparatus. The apparatus includes a housing 21, which can be made of plastic, or any other rigid material. The housing has a splitter compartment 31 and a splice compartment 29. The apparatus includes a splitter holder 12 that holds a plurality of splitters. In this particular embodiment, the splitter holder 12 holds three splitters 15, 16 and 17. The splitters 15, 16 and 17 can be any optical device that splits an input optical signal into a plurality of output signals. Examples of a splitter devices include, but are not limited to, planar lightwave circuit (PLC) or fused biconal taper (FBT) splitters. Each of the splitters 15, 16, and 17 has an input end 15a, 16a, and 17a and an output end 15*b*, 16*b* and 17*b*. The splitter holder 12 is positioned such that the longitudinal axis B of the splitters that goes through the input and output ends of the splitters has an angle Θ with respect to the front edge A of the apparatus. In a preferred embodiment, angle Θ is approximately 20 to 70 degrees, and preferably between 30 and 40 degrees. By angling the splitters, manufacturers can use splitters made in longer cases or conventional single mode fiber without violating single mode fiber bending limits.

Three input fibers 8, 9 and 10 from the splitter compartment 29 (shown in FIG. 4) go through fiber pass through 30 holes 11. The fibers are secured individually in grooves 11*a* in the fiber pass through 30 in order to insulate the input fiber from mechanical damage. After entering the splitter compartment, the fibers go around one of the fiber bend radius guides 4 and into the inputs ends 17*b*, 16*b* and 15*b* of respective splitters 15, 16 and 17. In this embodiment, thirty two output fibers exit the output end of each of the splitters. Item no. 19 represents thirty two of the output fibers outputting splitter 17. The fibers outputting splitters 15 and 16 are not shown. All of the fibers that output the splitters are bent around the fiber bend radius guides 4 in one or more loops. These fibers are organized and held in place by several routing/retaining tabs 2. The output fibers are then input to a multiple fiber connectors 5, such as the new FuseConnect MPO connectors. However, other multiple fiber connectors could be used. In this particular embodiment, twelve output fibers are input into each multiple fiber connector. Thus, the embodiment shown in FIGS. 1 and 2 have 96 output fibers. Item no. 14 represents twelve output fibers going into the one of the multiple fiber connectors 5. Commonly known methods of fiber management may be used to organize the fibers, such as ribbons and loose tubes, The multiple fiber connectors 5 are connected to respective multiple fiber adapters 6 that are mounted in the housing 21. Removable dust caps 7 are shown inserted into the multiple fiber adapters 6.

Holes 3 go through the apparatus 1 and can be used as mounting bosses that can be used to mount the apparatus or to connect several apparatuses together.

FIG. 3 shows an isometric view of the apparatus with the splitter compartment cover 32 on.

Figure 4:
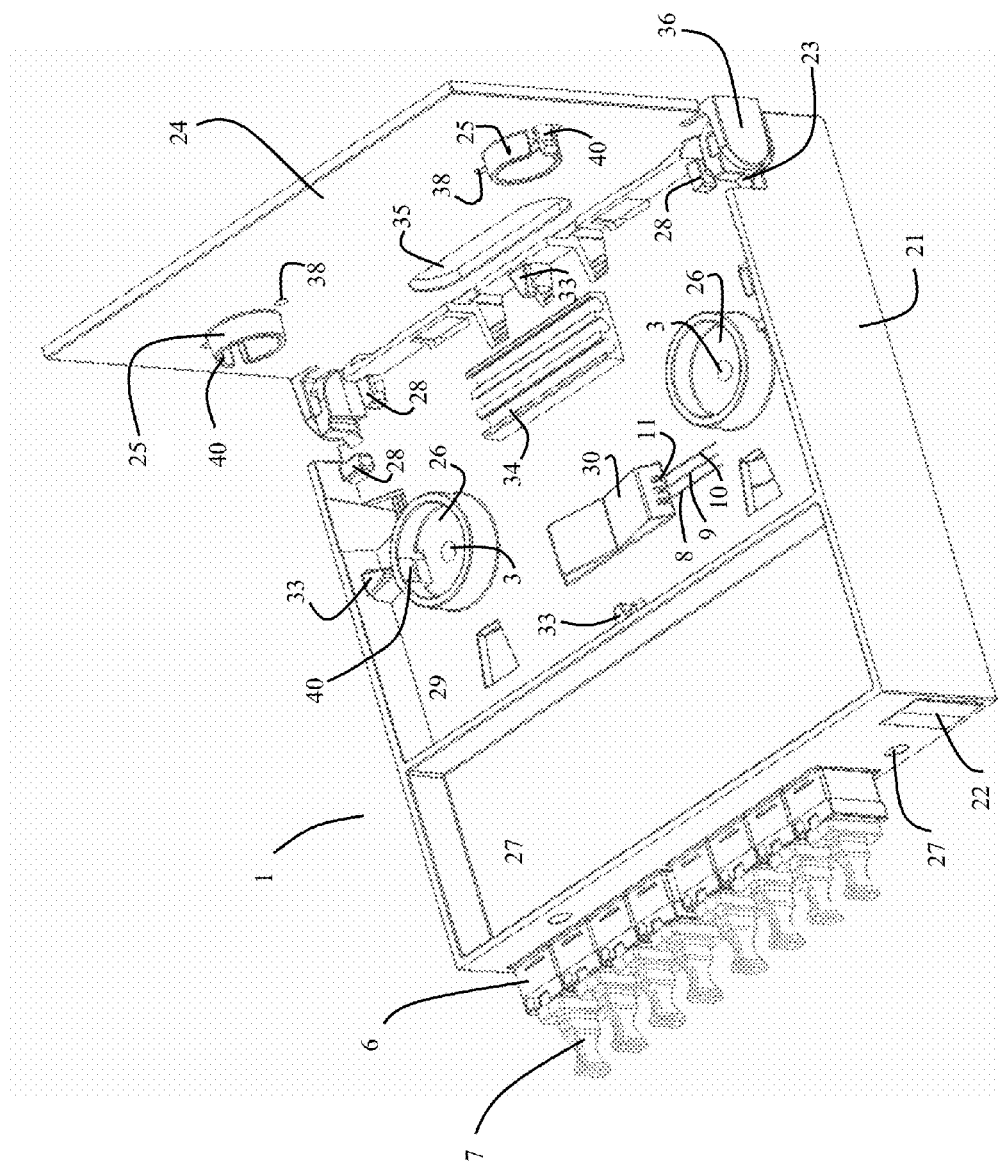
FIG. 4 shows another isometric view of a first embodiment of a multiple fiber connector version of the invention.
Figure 5:
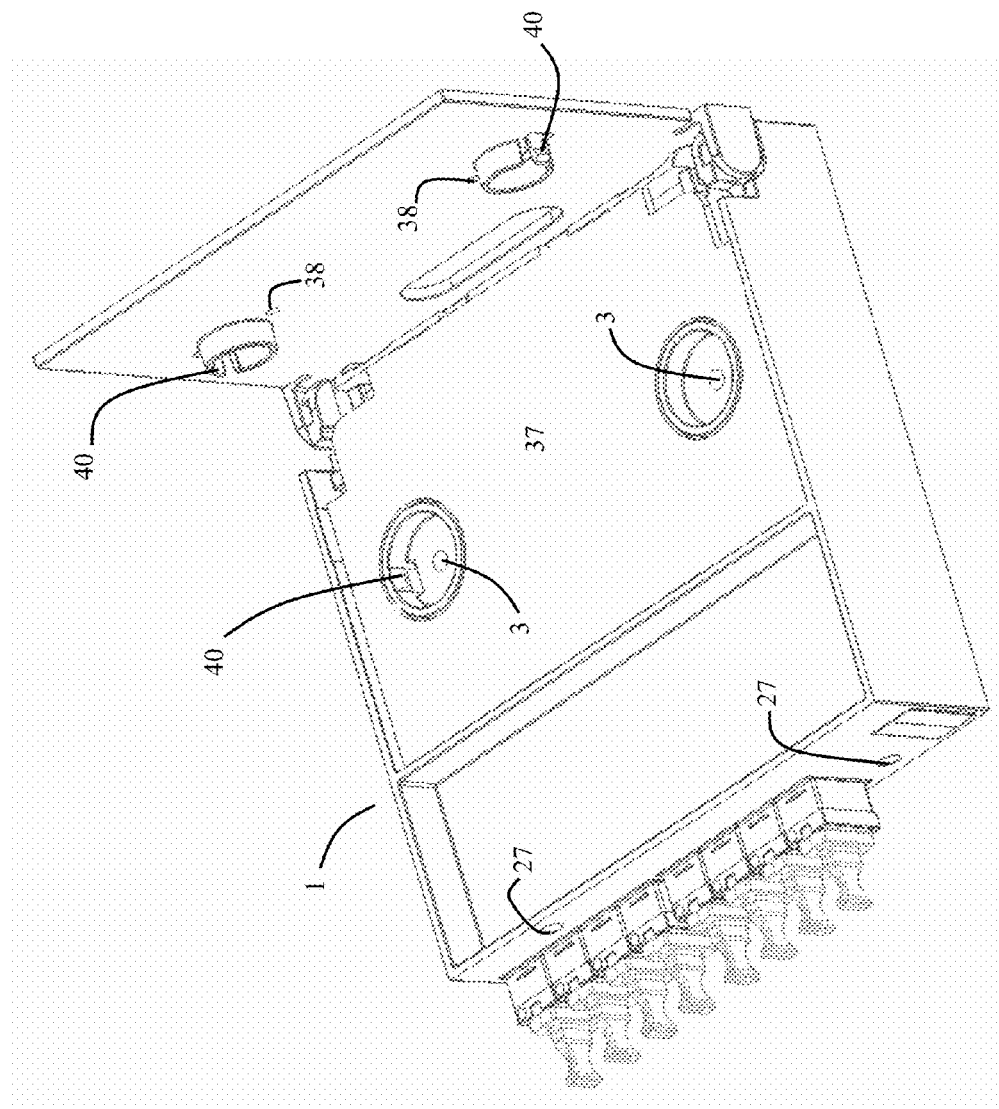
FIG. 5 shows another isometric view of a first embodiment of a multiple fiber connector version of the invention.

FIG. 4 shows an isometric view of the splice tray side of the apparatus 1. This view shows the splice tray compartment 29 with the hinge plate 24 at a ninety degree angle. The splice tray compartment cover 37 is not shown in this figure, but is shown in FIG. 5. Non-connectorized provider fibers (not shown) from a provider would enter the apparatus at one of the openings 23. The provider fibers may be secured to the apparatus 1 by using one or more of the tie downs 28. The provider fibers are spliced to the input fibers 8, 9 and 10, by known conventional splicing methods, and then the splice (not shown) is secured in the splice chip/sleeve holder 34. The input fibers are then routed around the fiber bend radius guides 26 before passing through holes 11 in the fiber pass through 30, where they enter the splicer compartment 31. Portions of input fibers 8, 9 and 10 are shown entering the holes 11 in the fiber pass through 30.

After the splices have been completed, splice tray compartment cover 37 is removably attached to enclosure 21. While splice tray compartment cover 37 is shown as opaque in FIG. 5, the splice tray compartment cover can also be transparent, which would allow a user to view the splices without removing the splice tray compartment cover.

Excess fiber can be maintained in either or both of the splitter or splice compartments so that if a fiber breaks, a new splice can be performed.

The hinge plate 24 is removably and rotatably attached to the housing 21 by a hinge mechanism 36. The hinge plate 24 can be used to mount the apparatus in various manners and enclosures. Hinge plate 24 also has several mounting holes 38 and 39 (see FIGS. 4-6) that can be used to attach or mount the apparatus or to attach several apparatuses together. Apparatus 1 also has recesses 26, into which hinge plate stand-offs 25 can be inserted. The recesses and stand-offs prevent mounting devices, such as a screw or bolt from interfering with the opening and closing of the hinge plate 25. There are also tabs 40 on the hinge plate that allow the hinge plate to remain in a closed position.

The apparatus 1 also includes several mounting holes 27 that can be used to attach structures that can allow the apparatus to be mounted in various enclosures or racks.

Figure 6:
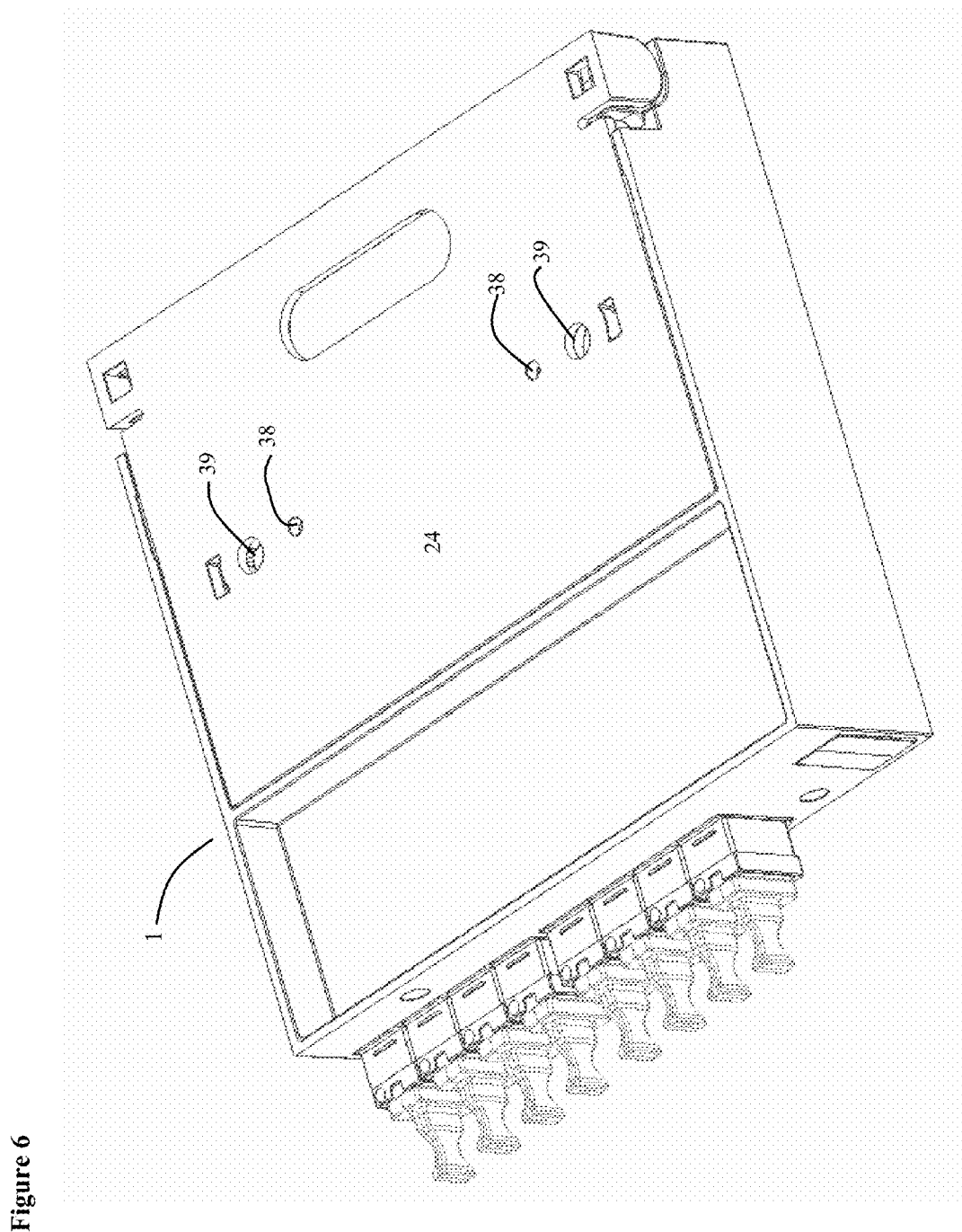
FIG. 6 shows another isometric view of a first embodiment of a multiple fiber connector version of the invention.

FIG. 6 shows the splice tray compartment 29 with the hinge plate 24 in a closed position.

Figure 7:
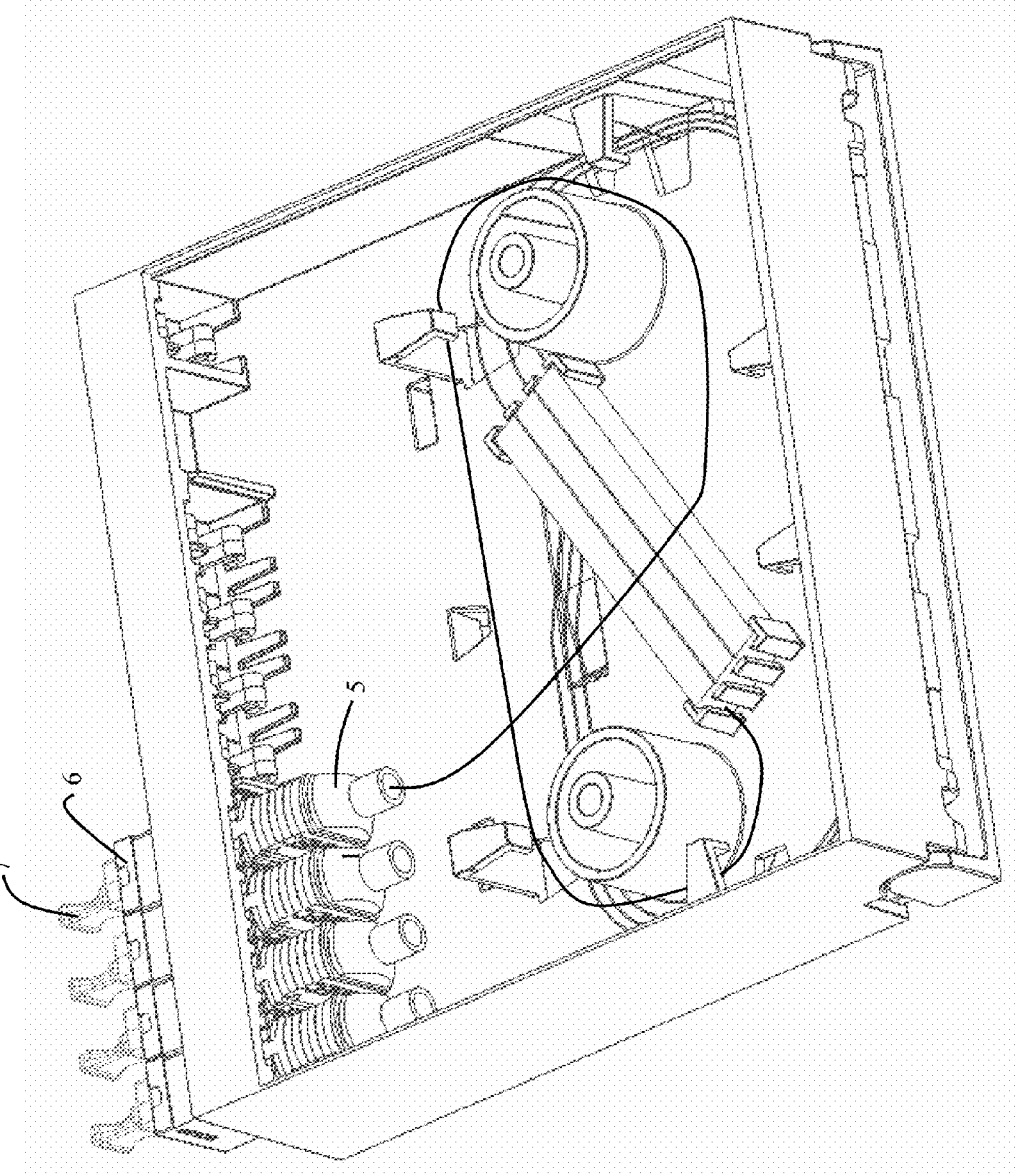
FIG. 7 shows an isometric view of a second embodiment of a multiple fiber connector version of the invention.

As an alternative, if the input fibers are spliced to the provider fibers outside of the apparatus 1, hole 22, shown in FIGS. 2 and 4, can be used as an input for the input fibers. In that situation, the input fibers would be routed around the fiber bend radius guides 4 and then input to the respective splitters FIG. 7 shows an isometric view of a second embodiment of a multiple fiber connector version of the invention. This version is a 3×48 version, i.e., 3 inputs and 48 outputs. The structure of the apparatus is the same as that shown in FIGS. 1-6 except that there are only four multiple fiber connectors 5, adapters 6 and dust caps 7 and plugs fill the empty adapter slots.

Figure 8:
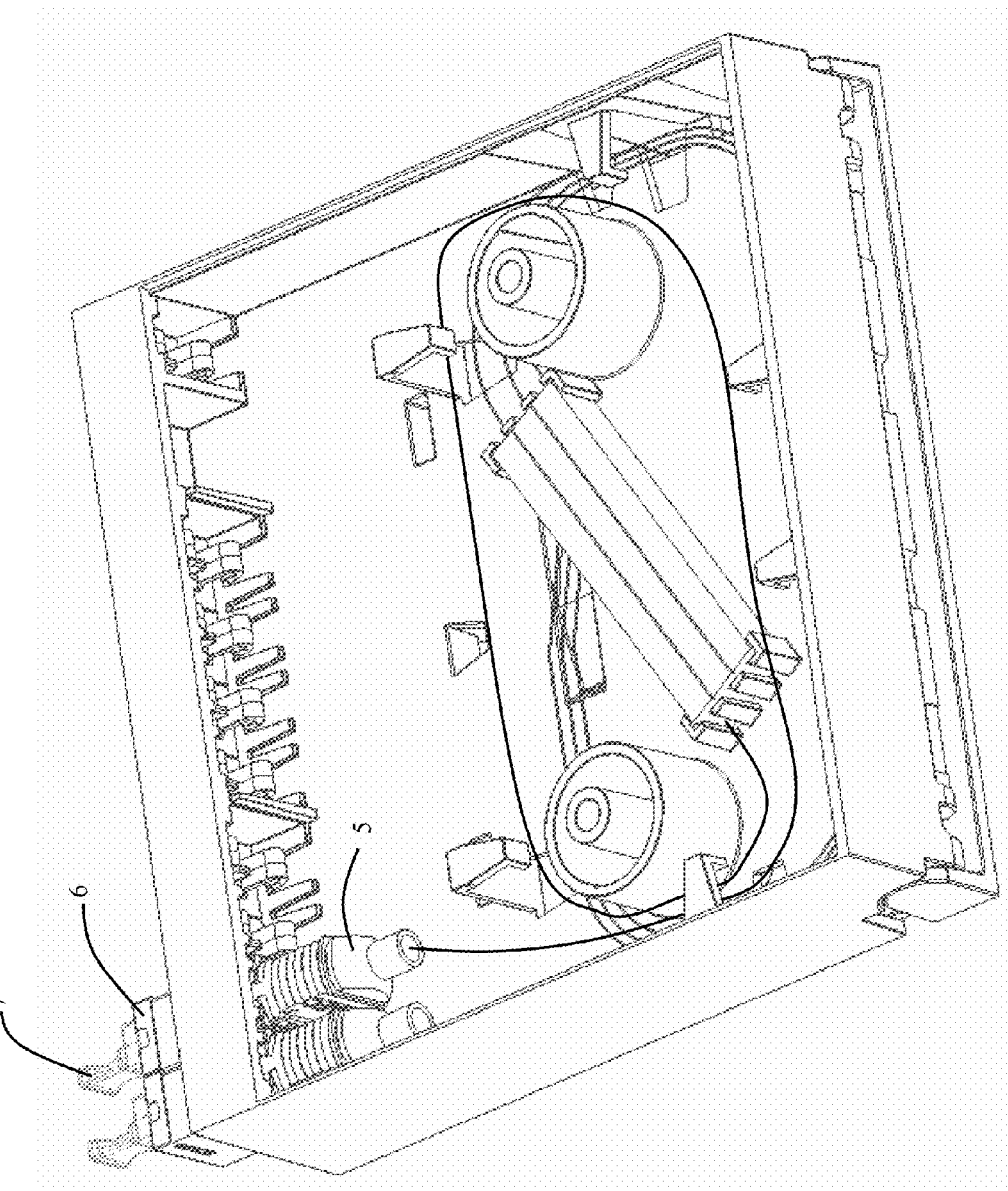
FIG. 8 shows an isometric view of a third embodiment of a multiple fiber connector version of the invention.

FIG. 8 shows an isometric view of a third embodiment of a multiple fiber connector version of the invention. This version is a 3×24 version, i.e., 3 inputs and 24 outputs. The structure of the apparatus is the same as that shown in FIGS. 1-6 except that there are only two multiple fiber connectors 5, adapters 6 and dust caps 7.

Figure 9:
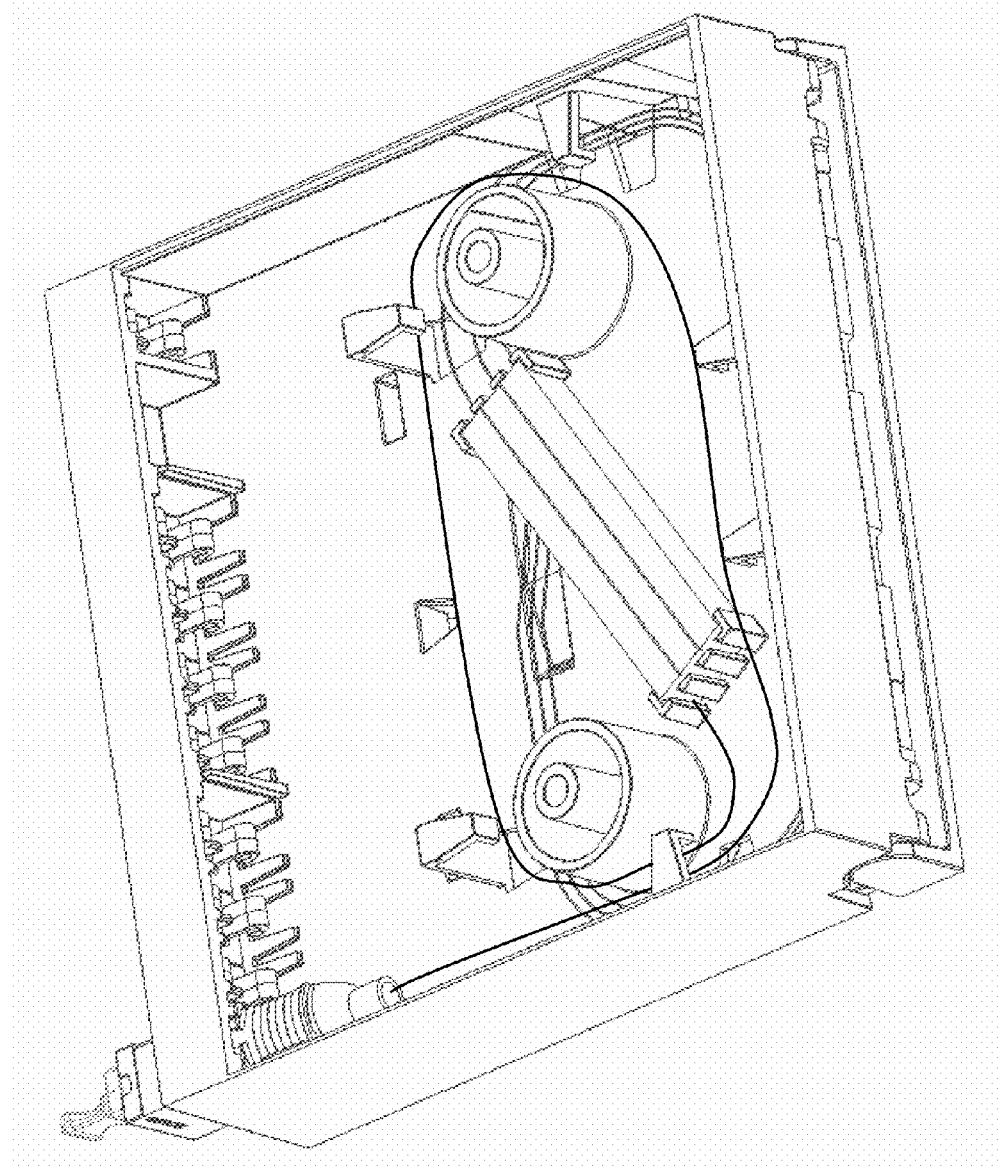
FIG. 9 shows an isometric view of a fourth embodiment of a multiple fiber connector version of the invention.

FIG. 9 shows an isometric view of a fourth embodiment of a multiple fiber connector version of the invention. This version is a 3×12 version, i.e., 3 inputs and 12 outputs. The structure of the apparatus is the same as that shown in FIGS. 1-6 except that there is only one multiple fiber connector 5, adapter 6 and dust cap 7.

Figure 10:
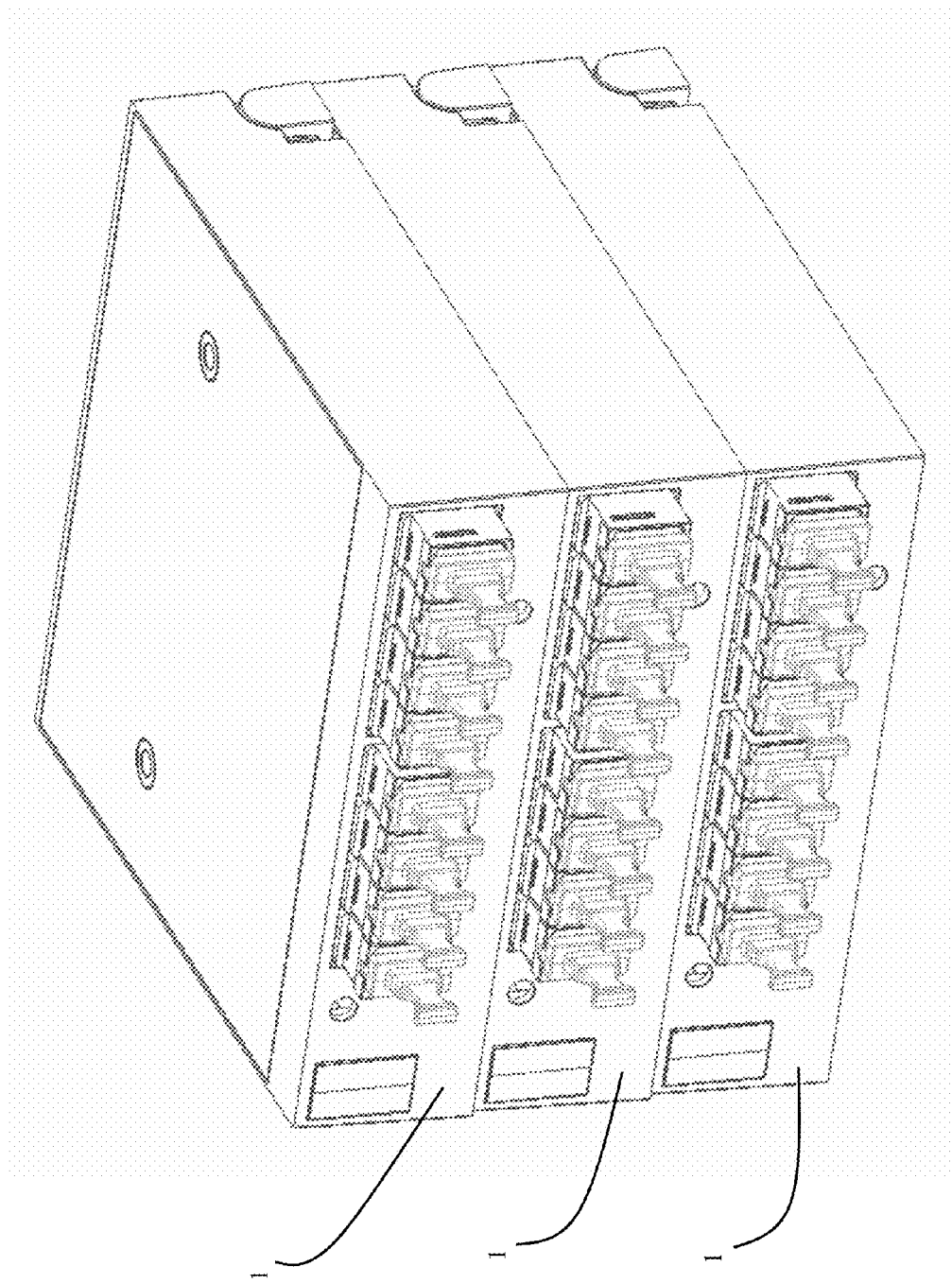
FIG. 10 shows an isometric view of a fifth embodiment of a multiple fiber connector version of the invention.

FIG. 10 shows an isometric view of a fifth embodiment of a multiple fiber connector version of the invention. In this embodiment three apparatuses 1 are stacked together. For example, FIG. 10 shows three 3×96 modules attached to each other, which makes it a 9×288 apparatus. The apparatuses can be attached to each with mounting hardware through holes 3 and 39 for example. As a comparison, the dimensions of this stacked 288 subscriber apparatus in FIG. 10 are approximately 3.5×4×4 inches. On the other hand the dimensions of a typical 288 subscriber FDH are approximately 25×20×20 inches.

Figure 11:
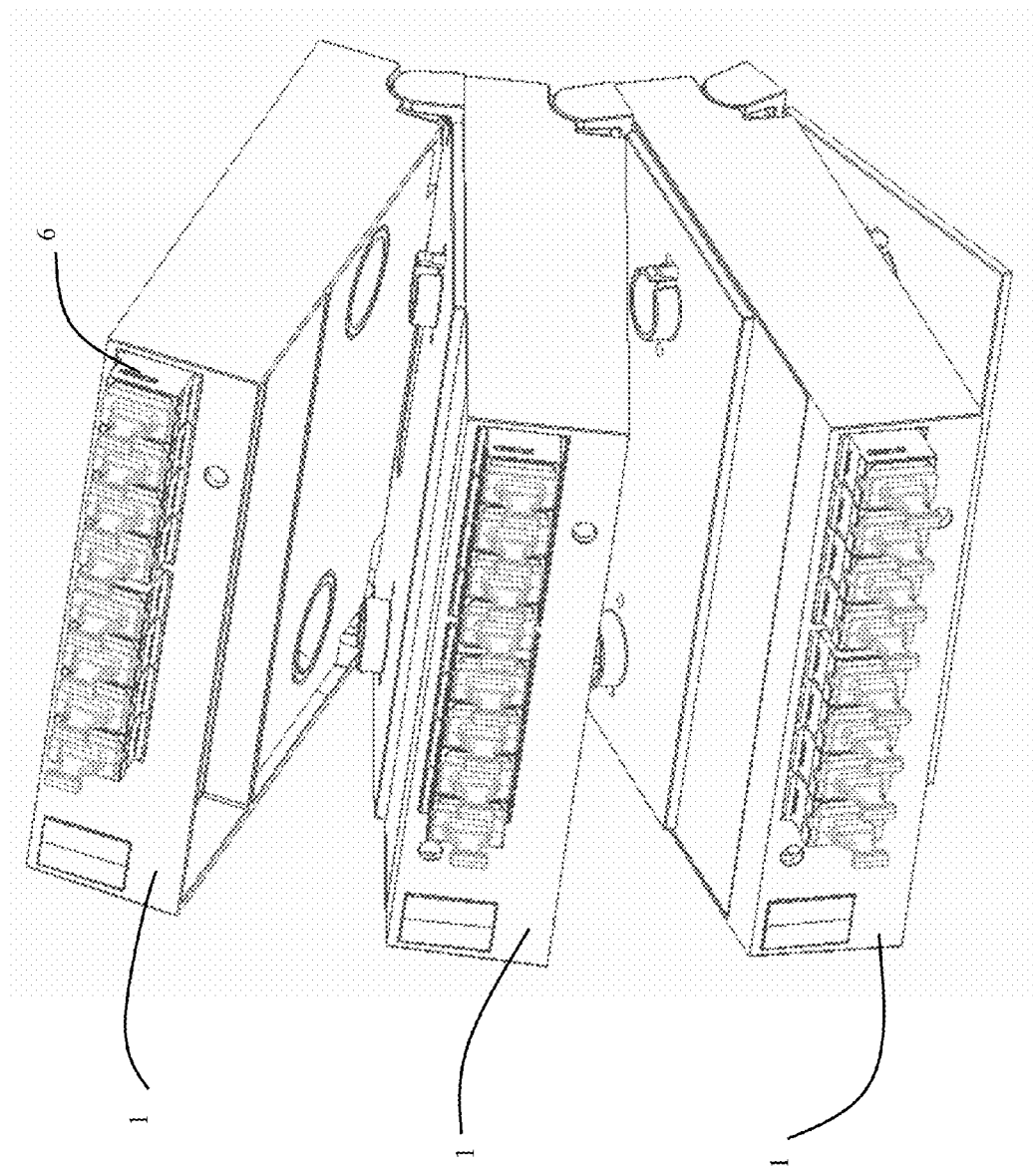
FIG. 11 shows an isometric view of a fifth embodiment of a multiple fiber connector version of the invention.
Figure 12:
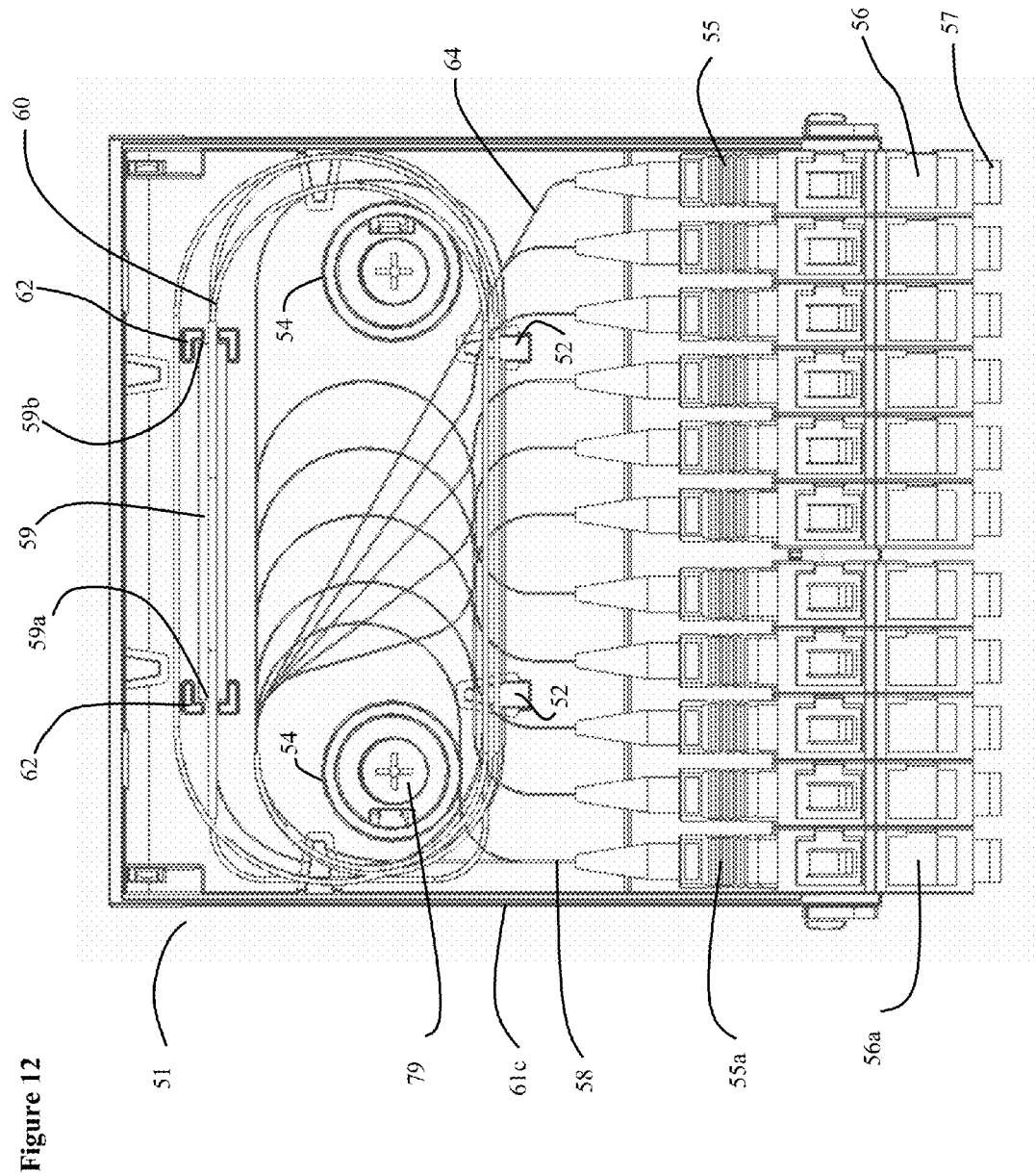
FIG. 12 shows a plan view of a first embodiment of a single fiber connector version of the invention.

In FIG. 10, the apparatuses 1 are shown with their hinge plates in a closed position. Whereas in FIG. 11, the apparatus 1 are shown with their hinge plates opened slightly. With the hinge plates in an open position, it is easier to insert and remove subscriber cables that are inserted into the multiple fiber adapters 6.

The multiple fiber connector embodiment is not limited to the specific embodiments above. Other combinations of inputs, multiple fiber outputs and splitters are possible.

Figure 14:
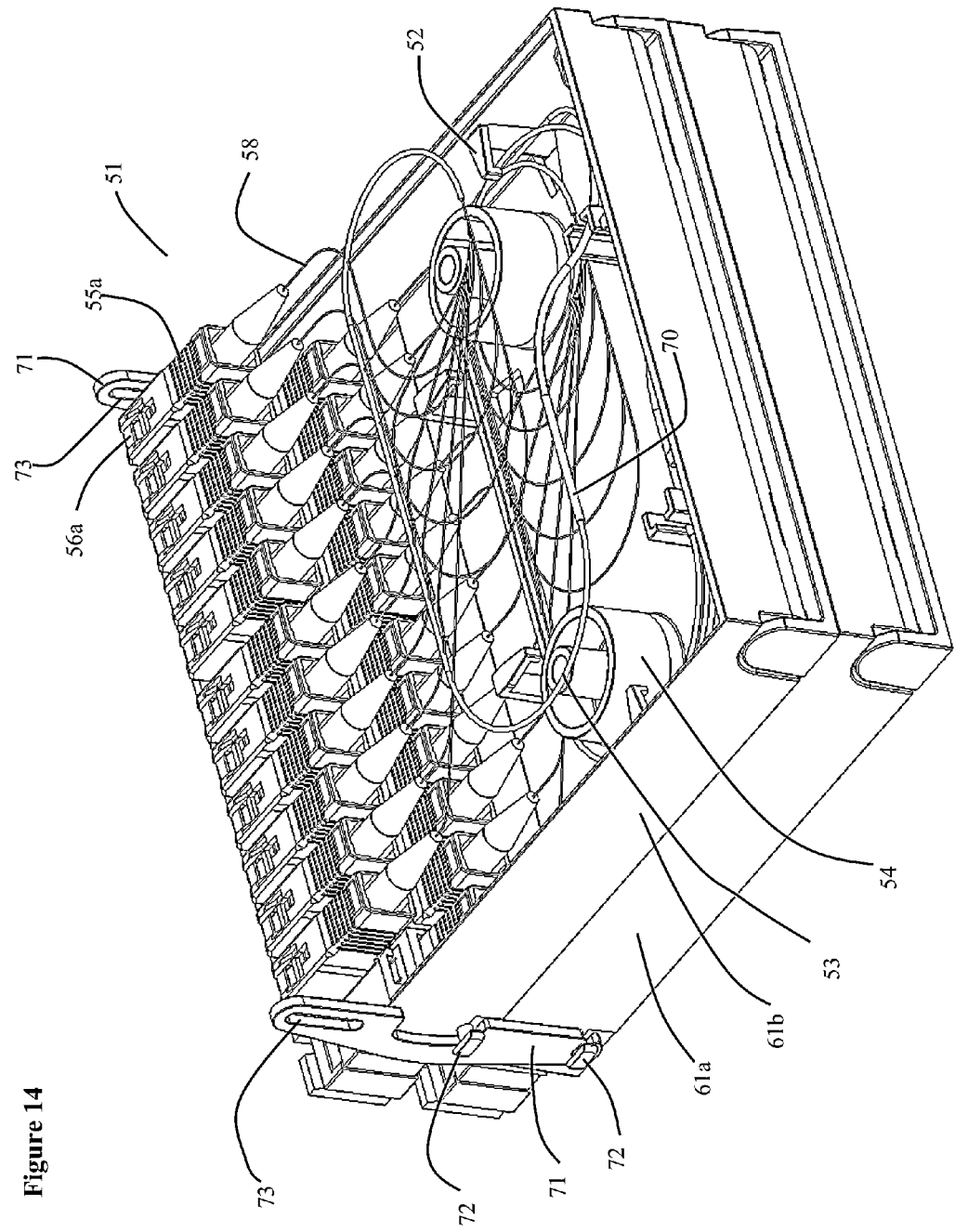
FIG. 14 shows an isometric view of a first embodiment of a single fiber connector version of the invention.
Figure 15A:
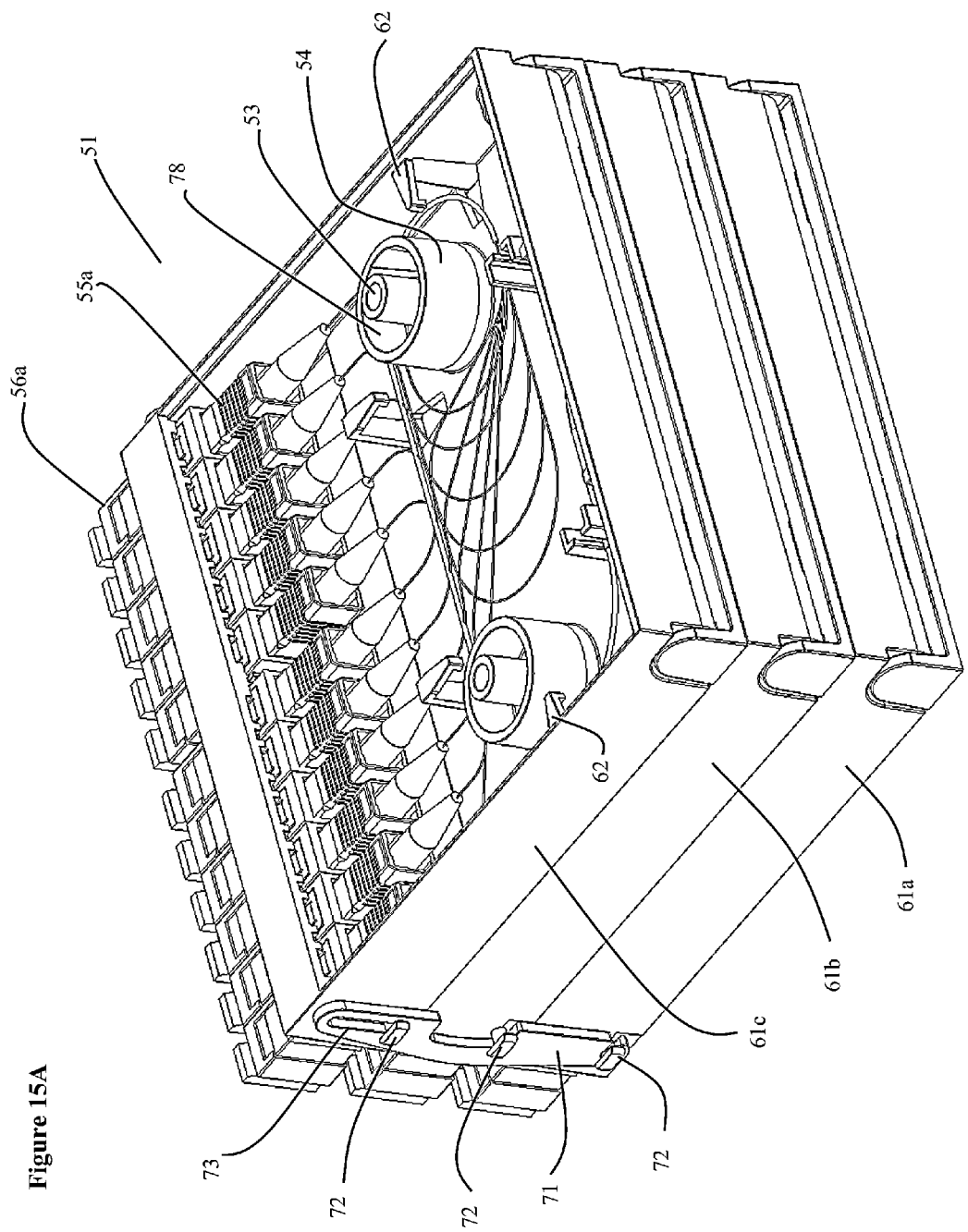
FIGS. 15A and 15B show isometric views of a first embodiment of a single fiber connector version of the invention.
Figure 15B:
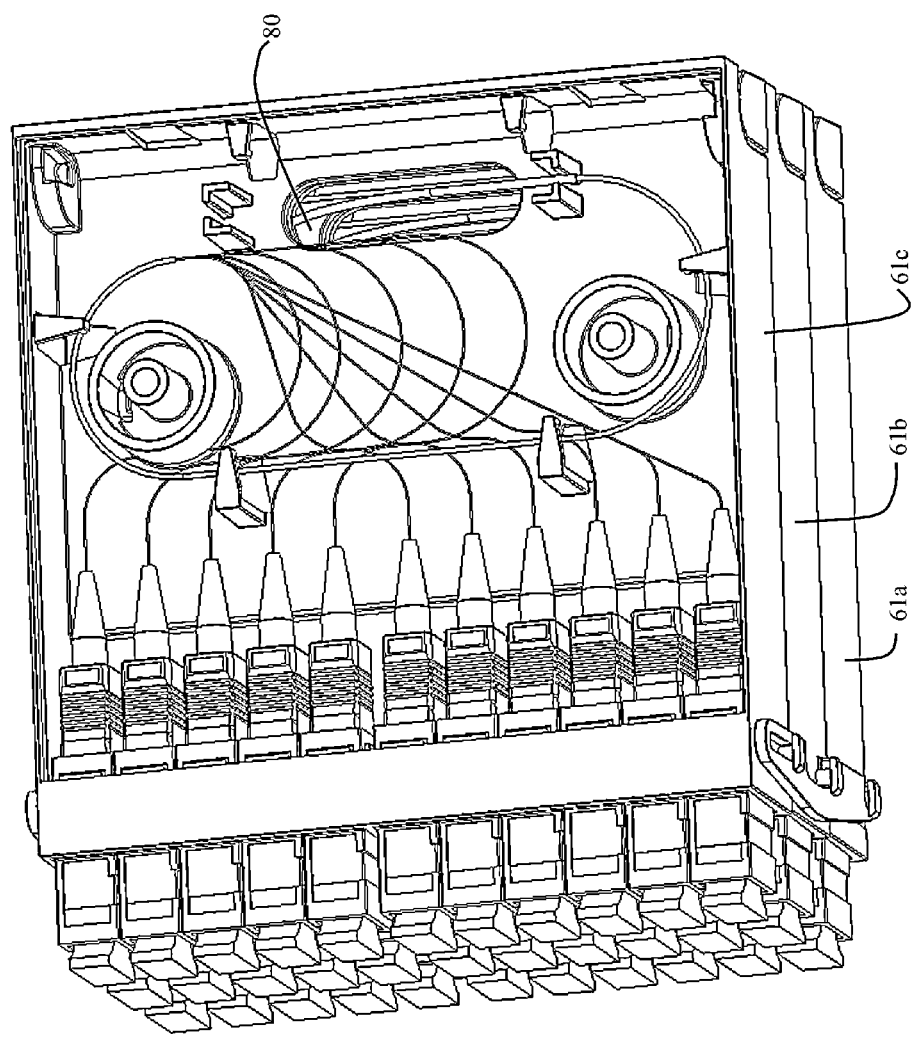
Figure 16:
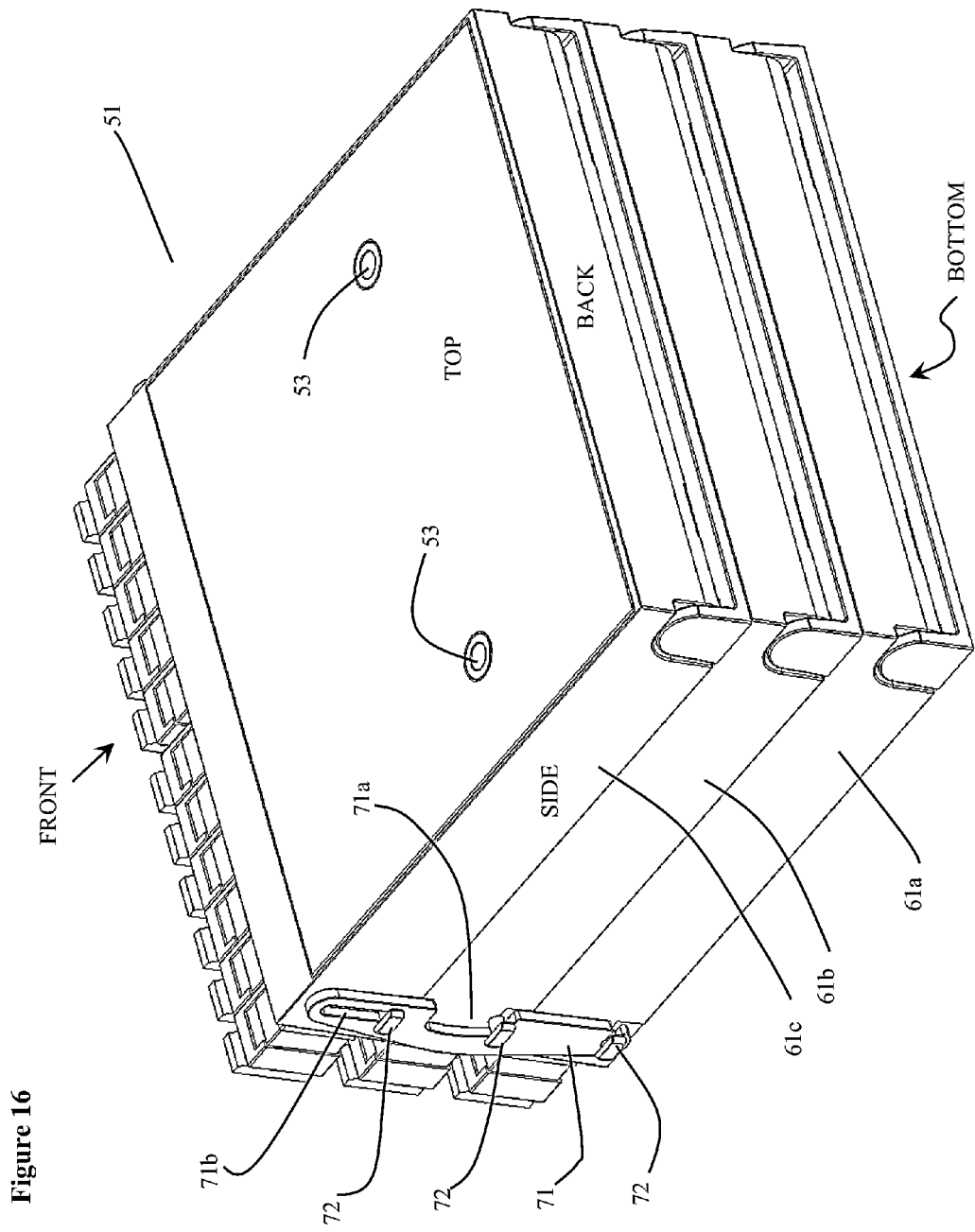
FIG. 16 shows an isometric view of a first embodiment of a single fiber connector version of the invention.

FIGS. 12-14, 15A and 15B show plan and isometric views of a first embodiment of a single fiber connector version of the integrated distribution enabling access apparatus 51 (the splitter compartment cover is not shown, however, it is shown in FIG. 16). An advantage of the single fiber connector version is that it provides for individual patching of distribution fibers. This particular embodiment is a 1×32 splitter apparatus. The apparatus includes a housing 61a, 61b and 61c, which can be made of plastic or any other rigid material. The housings 61a, 61b and 61c are similar to the housing 21 in the multiple fiber connector embodiment described above. The apparatus includes a splitter holder 62 that holds a splitter 59. Splitter 59 can be any optical device that splits an input optical signal into a plurality of output signals. Examples of a splitter devices include, but are not limited to, planar lightwave circuit (PLC) or fused biconal taper (FBT) splitters. The splitter 59 has an input end 59a and an output end 59b.

Figure 13:
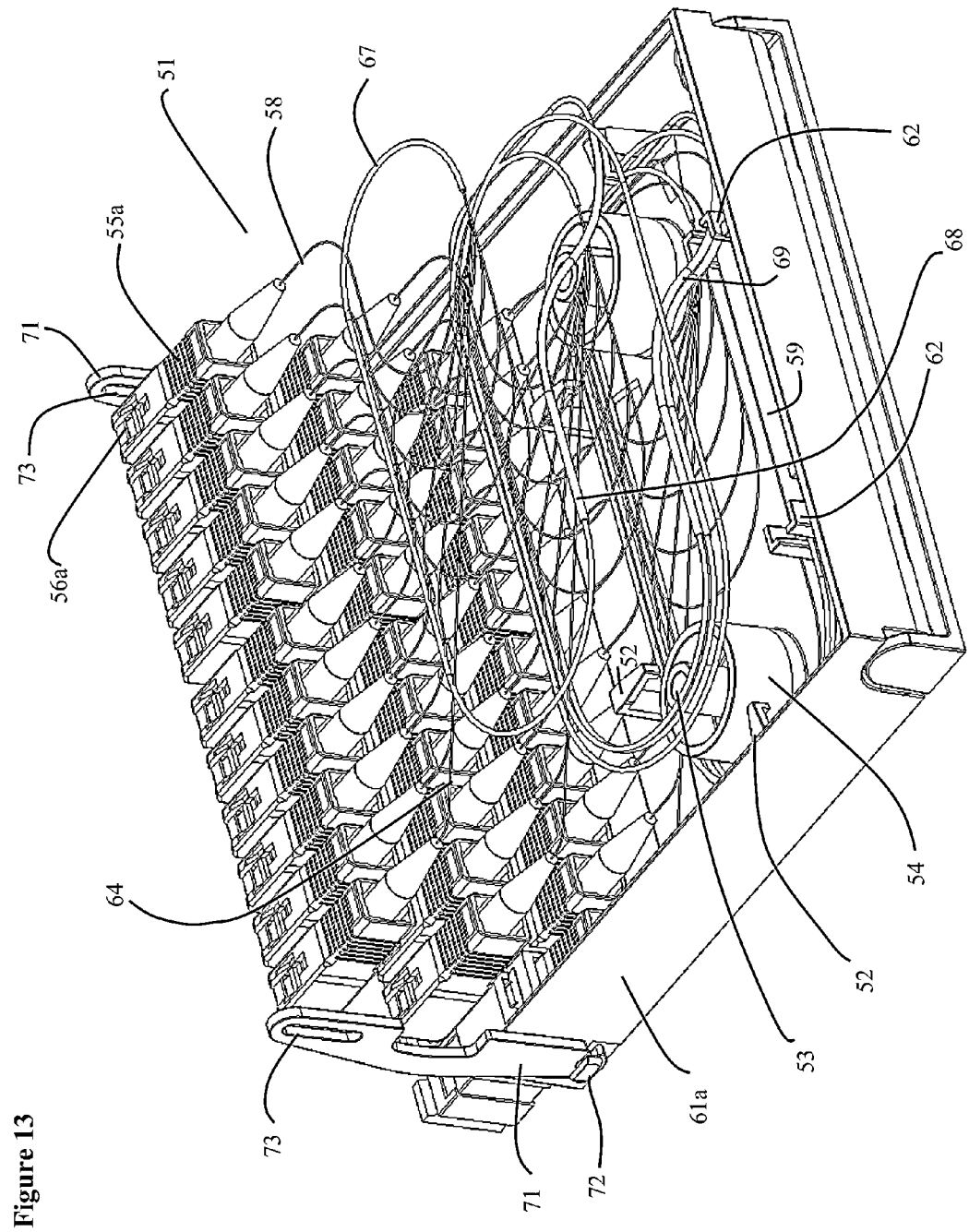
FIG. 13 shows an isometric view of a first embodiment of a single fiber connector version of the invention.
Figure 26:
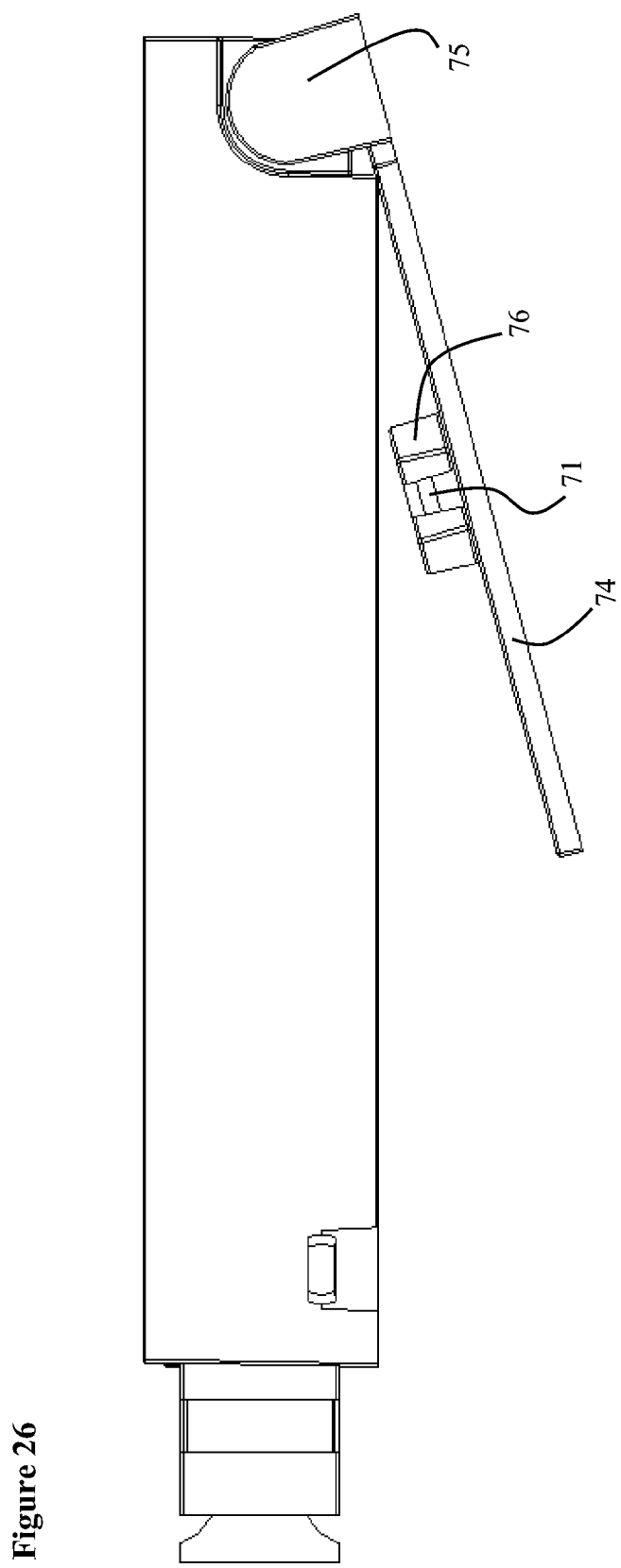
FIG. 26 shows an side view of a third embodiment of a single fiber connector version of the invention.

FIGS. 13, 14, 15A and 15B show the apparatus with different portions of the housings not shown. Each housing includes a top and bottom, two sides, a back, a front area and a hinge plate. The connector adapters are mounted in the front area. See FIG. 16. For example, FIG. 13 shows portions of housing 61a (sides, back, bottom and front), whereas FIG. 14 shows housings 61a and portions of 61b (sides, back, bottom and front) and FIGS. 15A and 15B shows housings 61a and 61b and portions of 61c (sides, back, bottom and front). FIG. 26 shows the hinge plate 74 and hinge mechanism 75. The hinge plate 74 and hinge mechanism 75 are similar to, and have the same features as, the hinge plate 24 and hinge mechanism 36 shown FIG. 4. For example, it contains the same mounting holes 38 (not shown) and 39 (77) and recesses 26 (78), into which hinge plate stand-offs 25 (76) can be inserted.

Apparatus 51 includes single fiber connectors 55 and single fiber adapters. One example of a single fiber connector/adapter is an SC FuseConnect connector. However, other single fiber connector/adapters could be used. One of the thirty three connector/adapters 55/56 acts as an input for an input fiber (such as from a service provider) and the other thirty two connectors/adapters 55/56 act as the output for output fibers (such as fibers going to a subscriber). In the embodiment shown in the figures, connector 55a and adapter 56 act as the input and all of the others are the outputs. However, any one of the thirty three connectors/adapters could be the input. Removable dust caps 57 are also shown in the figures. In addition, there could be more than one input in other configurations.

Inside of the apparatus, a fiber from the input connector 55a (fiber 58) is connected to the input end 59a of splitter 59. The input fiber 58 may be wound around fiber bend radius guides 54 in one or more loops before entering the splitter 59. Thirty two fibers exit the output end 59b of splitter 59. Item number 60 represents the output fibers. The output fibers are wound around fiber bend radius guides 54 in one or more loops and each output fiber is connected to respective output connectors 55, which are inserted into the adapter 56. Fiber 64 is one example of an output fiber being connected to an output connector 55. The output fibers are organized and held in place by several routing/retaining tabs 52 before being connected to the output connectors 55. Other fiber management structures may also be used, such as jackets and sleeves 67, 68, 69 and 70 shown in FIGS. 13 and 14. Please note that the routing of the fibers in the figures are exemplary and are not intended to accurately show the actual fibers and connections.

FIG. 15A shows an isometric view apparatus 51 with most of the enclosure removed. While this view shows all thirty three fibers in the body of the enclosure, in the actual apparatus, the fibers are organized in three sections. For example, FIG. 15A shows the top section, or enclosure 61c, that routes the eleven fibers for the connectors/adapters in enclosure 61c. If the splitter is in enclosure 61c, which it would be since this embodiment contains connector 55a and adapter 56a, fibers from enclosures 61a and 61b would be grouped and passed through their enclosures to enclosure 61c and the splitter. The enclosures contain holes and cutouts, such as hole 80 shown in FIGS. 15B and 21 and hole 35 in the hinge plate, that allow fibers to pass through them to other enclosures.

Apparatus 51 is built one enclosure at a time. For example after the fibers in enclosure 61a are connected, enclosure 61a is attached to hinge plate of enclosure 61b by screws 79 or bolts or other mounting hardware. Next, after the fibers in enclosure 61b are connected, enclosure 61b is attached to the hinge plate of enclosure 61c.

FIGS. 16-19 show the operation of a stopping mechanism 71 that prevents the hinge plates from opening with a full range of motion. Stopping mechanism 71 has a hole 71b and two grooves 71a and 71c. In addition, each enclosure has tabs 72. The stopping mechanism is positioned so that the tab 72 on enclosure 61c goes through hole 71b. Then stopping mechanism 71 is rotated until tabs 72 on enclosures 61b and 61c fit into grooves 71a and 71b. Groove 71c is made small enough so that tab 72 remains in groove 71c unless a user intentionally removes the tab 72 from the groove 71c.

Figure 17:
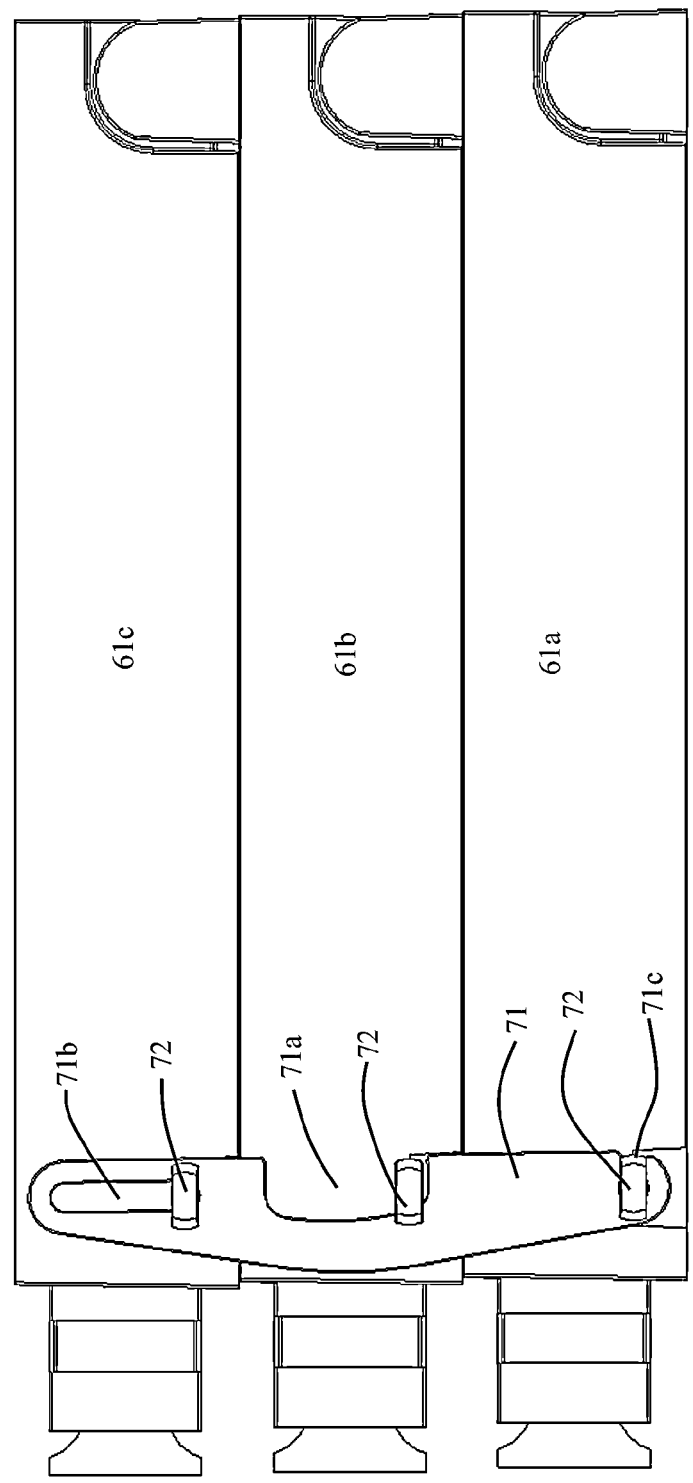
FIG. 17 shows a side view of a first embodiment of a single fiber connector version of the invention.
Figure 18:
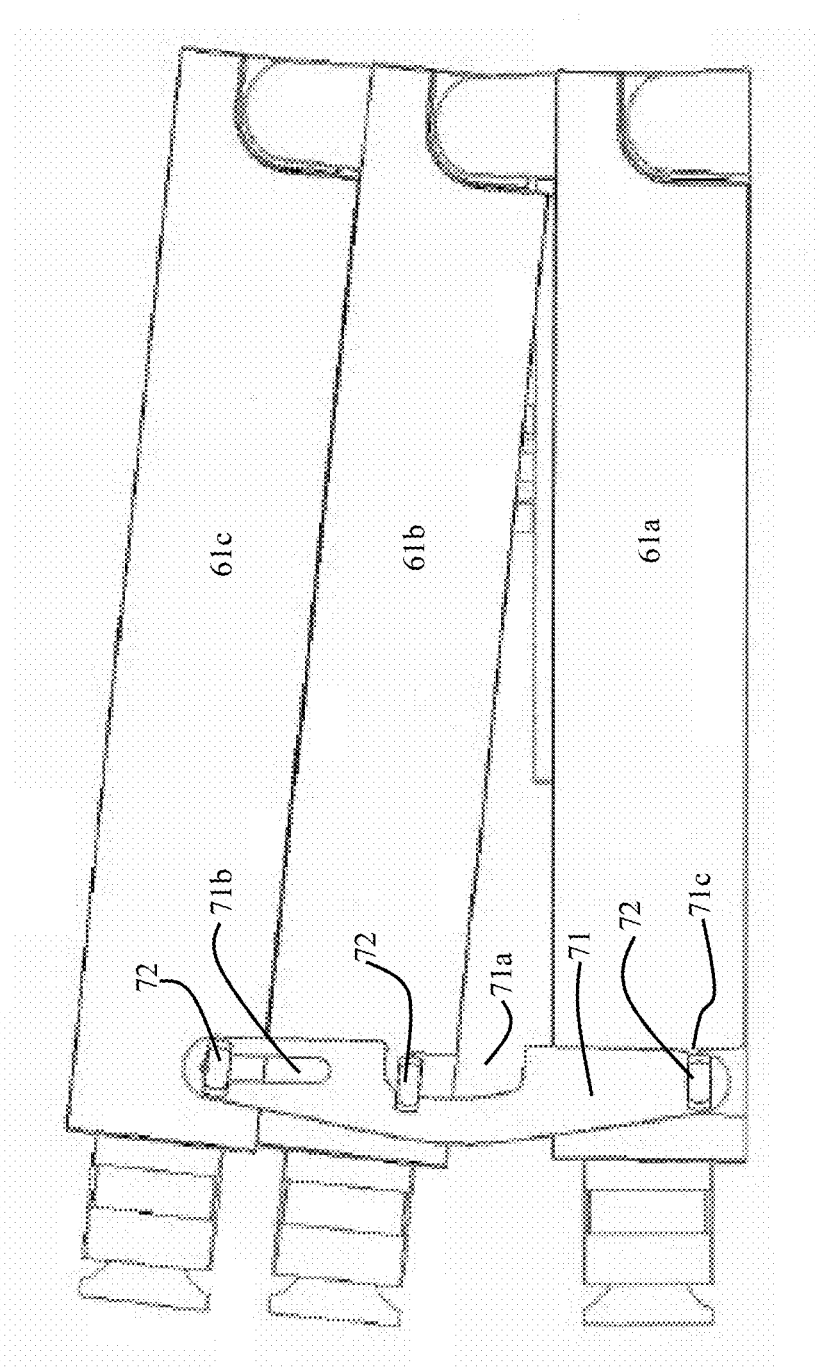
FIG. 18 shows another side view of a first embodiment of a single fiber connector version of the invention.
Figure 19:
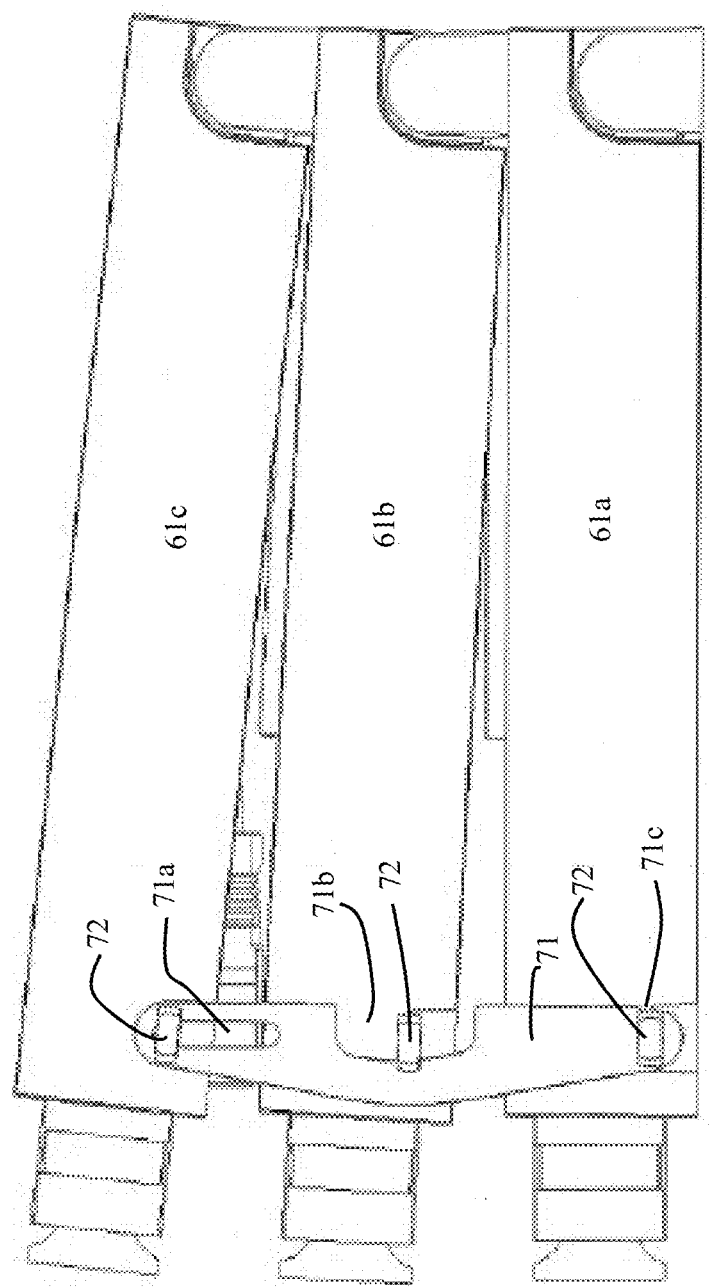
FIG. 19 shows another side view of a first embodiment of a single fiber connector version of the invention.

FIGS. 16 and 17 show all three enclosures in a closed position with respect to each other. FIG. 18 shows a separation between enclosures 61a and 61b. The hole 71b and groove 71a are sized such that a small separation can occur. FIG. 19 shows a slightly smaller separation between each of the enclosures. By allowing some separation between the enclosures, it makes it easier for the user to insert and remove input and out fibers from the adapters.

Figure 20:
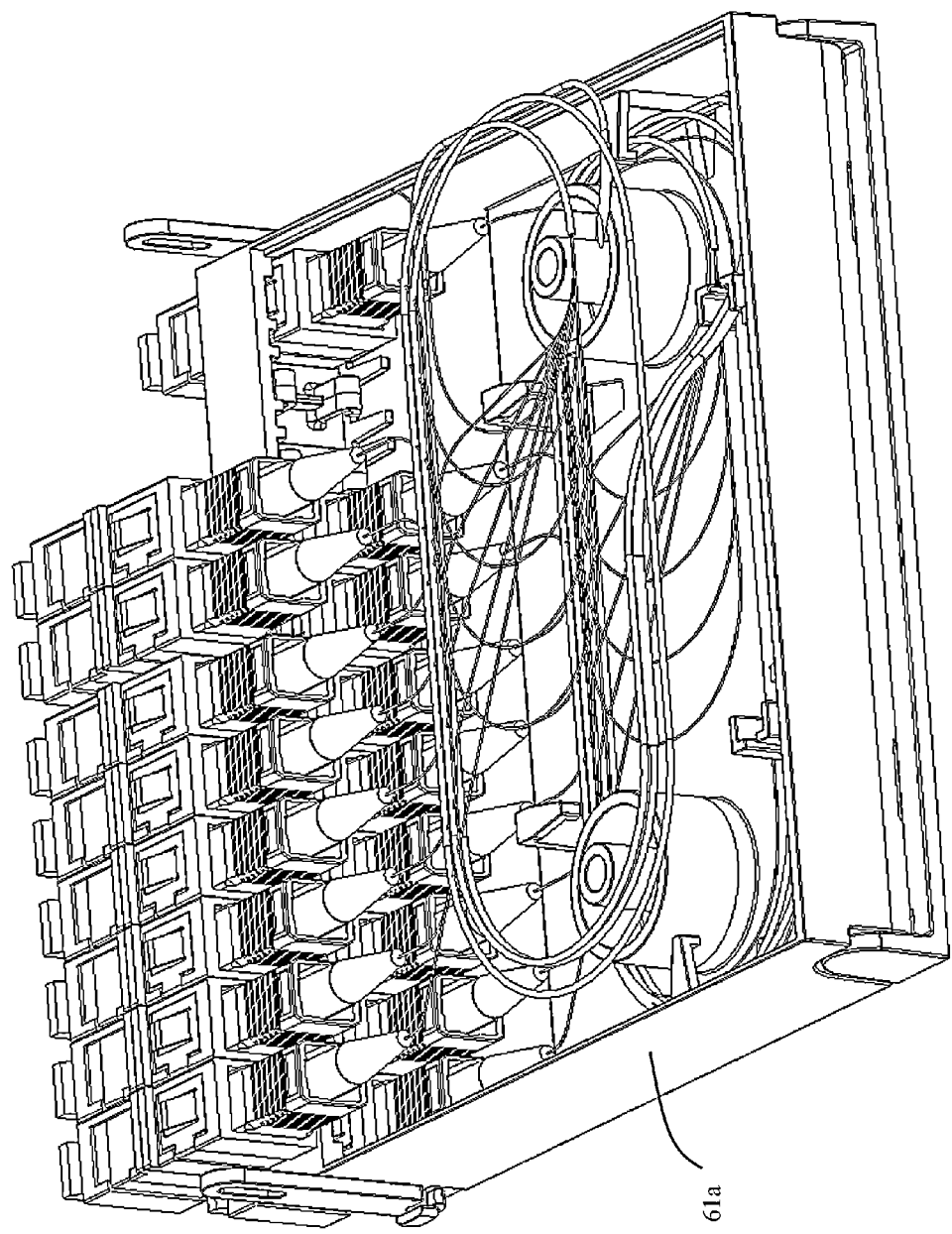
FIG. 20 shows an isometric view of a second embodiment of a single fiber connector version of the invention.
Figure 21:
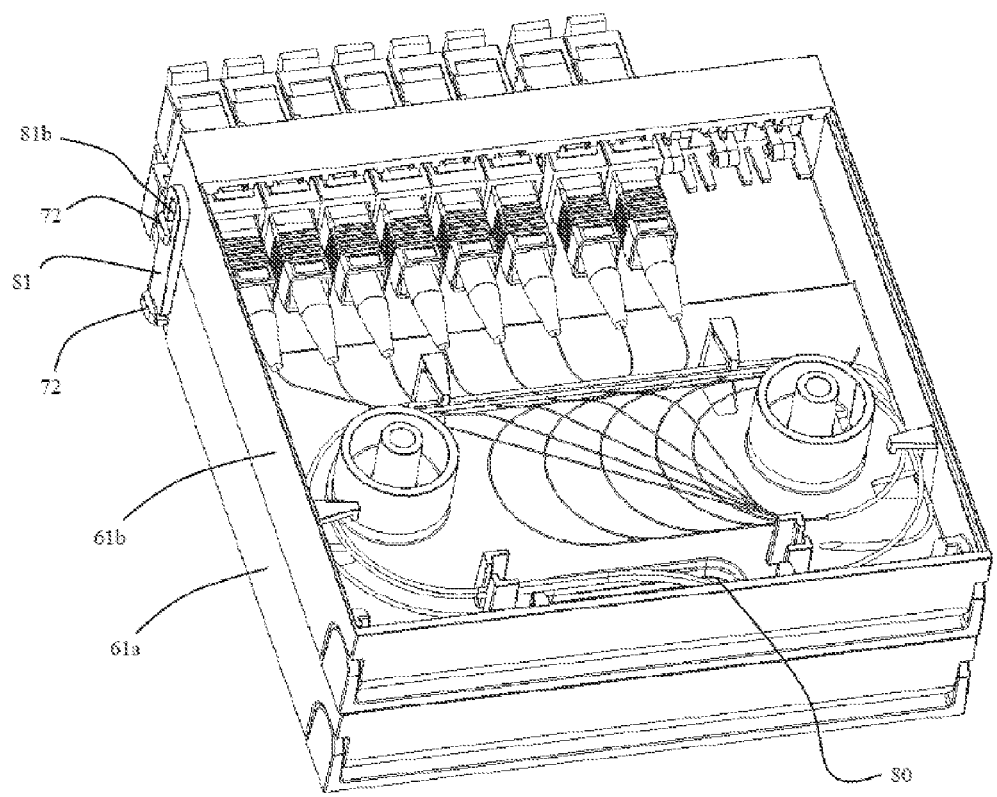
FIG. 21 shows an isometric view of a second embodiment of a single fiber connector version of the invention.

FIGS. 20 and 21 shows isometric views of a second embodiment of the single fiber connector version of the invention. This version is a 1×16 splitter. It is similar to the 1×32 version shown in FIGS. 12-19, except that is has two enclosures 61a and 61b, instead of three enclosures. This embodiment has all of the features of the 1×32 version.

Figure 22:
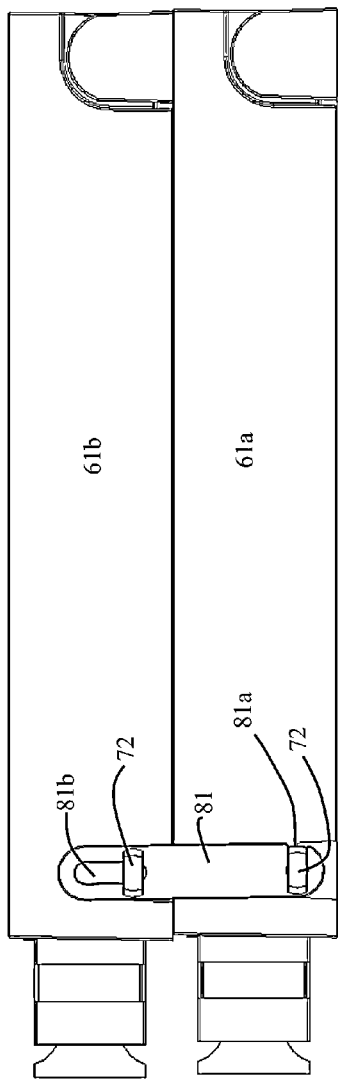
FIG. 22 shows a side view of a second embodiment of a single fiber connector version of the invention.
Figure 23:
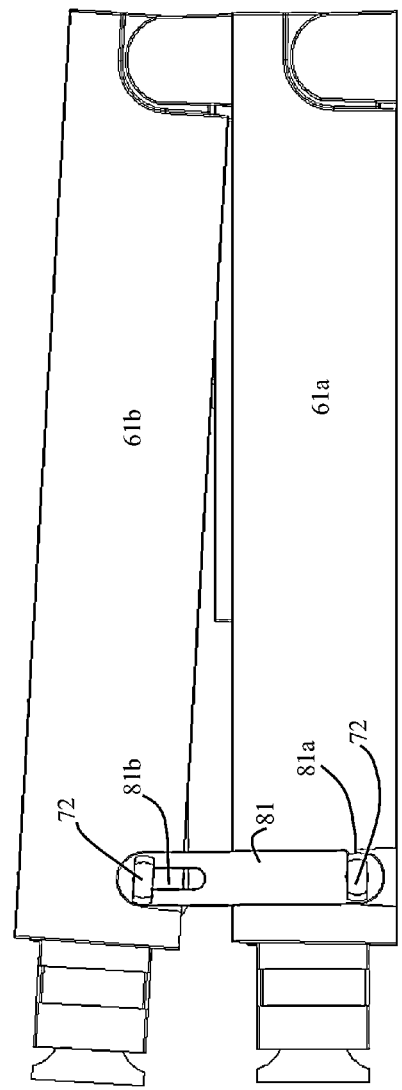
FIG. 23 shows another side view of a second embodiment of a single fiber connector version of the invention.

FIGS. 22 and 23 show the operation of the stopping mechanism 81 for the 1×16 version. Because this version has only two enclosures, the stopping mechanism 81 is smaller than stopping mechanism 71 and does not have a center groove corresponding to center groove 71a in the 1×32 version. However, it does have a hole 81b and groove 81a. It is also attached in a similar manner as stopping mechanism 71.

Figure 24:
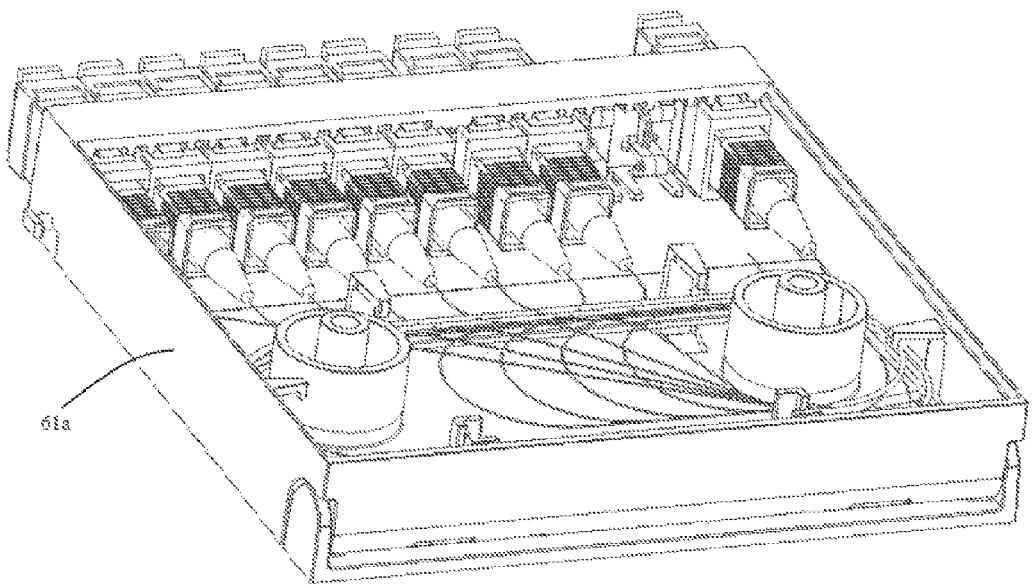
FIG. 24 shows an isometric view of a third embodiment of a single fiber connector version of the invention.
Figure 25:
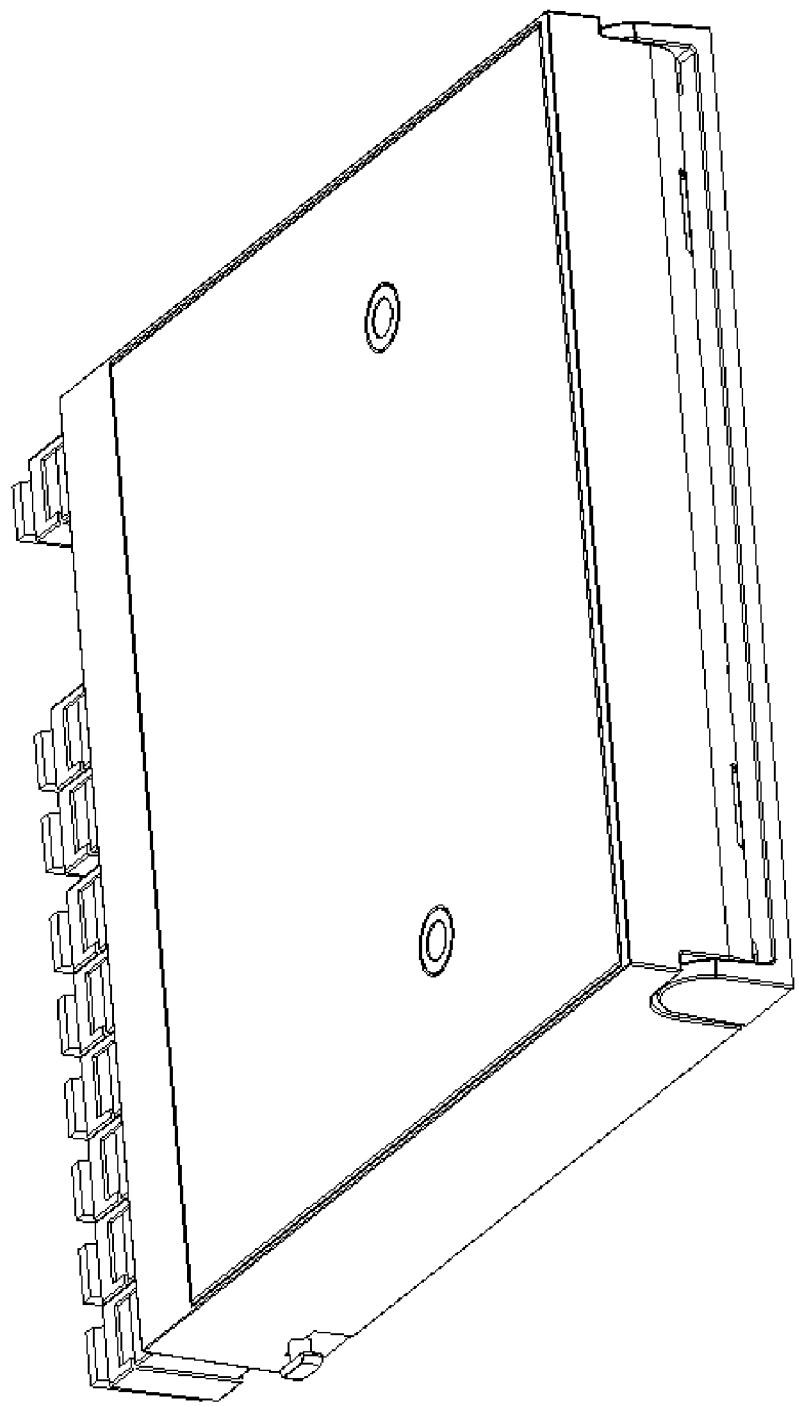
FIG. 25 shows an isometric view of a third embodiment of a single fiber connector version of the invention.

FIGS. 24-26 show views of a third embodiment of the single fiber connector version of the invention. This version is a 1×8 splitter. It is similar to the 1×32 version shown in FIGS. 12-19, except that is has one enclosure 61a, instead of three enclosures. This embodiment has all of the features of the 1×32 version, except for the stopping mechanism, which is not necessary.

Figure 27:
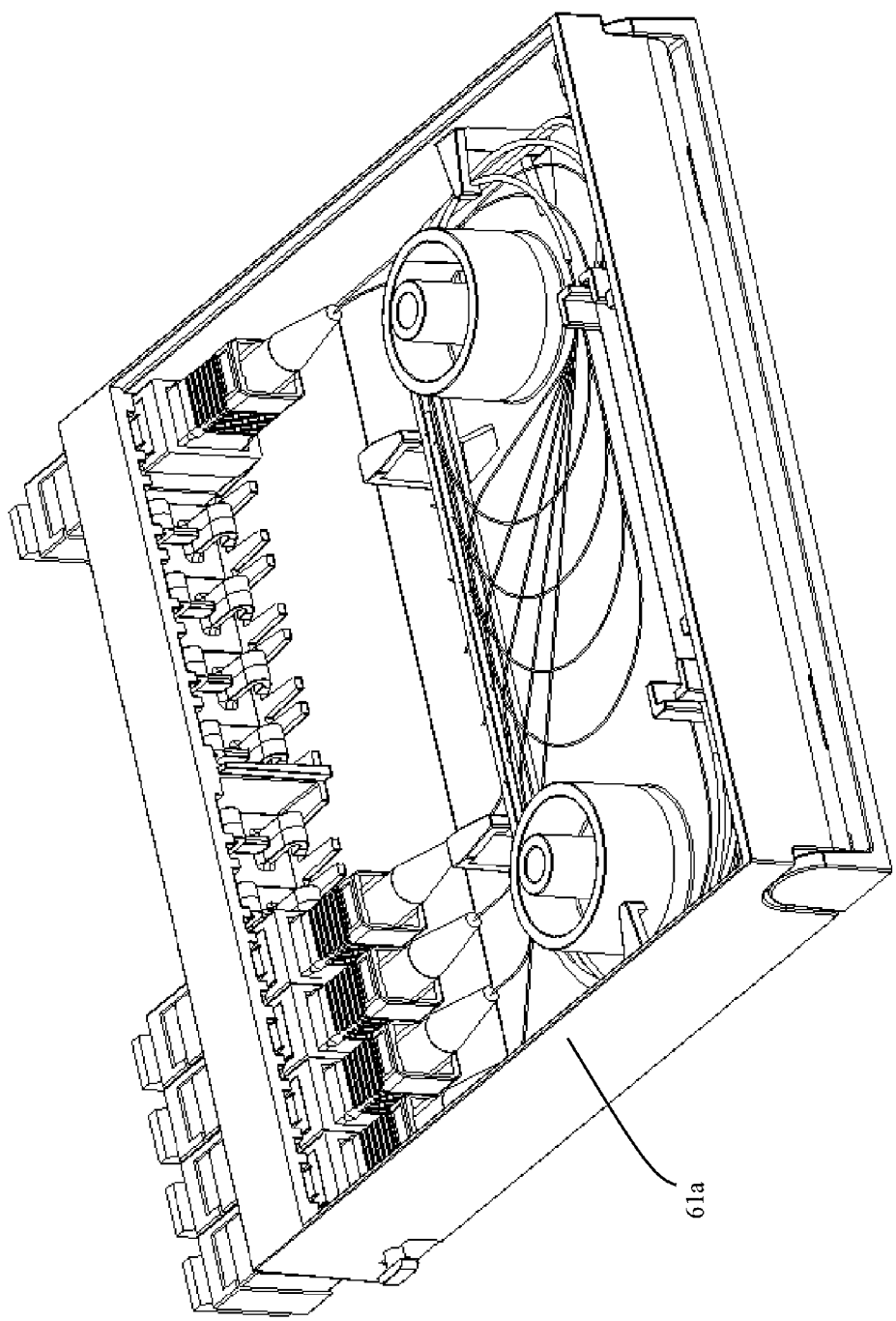
FIG. 27 shows an isometric view of a fourth embodiment of a single fiber connector version of the invention.

FIG. 27 shows a view of a fourth embodiment of the single fiber connector version of the invention. This version is a 1×4 splitter. It is similar to the 1×32 version shown in FIGS. 12-19, except that is has one enclosure 61a, instead of three enclosures. This embodiment has all of the features of the 1×32 version, except for the stopping mechanism, which is not necessary.

The single fiber connector embodiment is not limited to the specific embodiments above. Other combinations of inputs, fiber outputs and splitters are possible.

Figure 28:
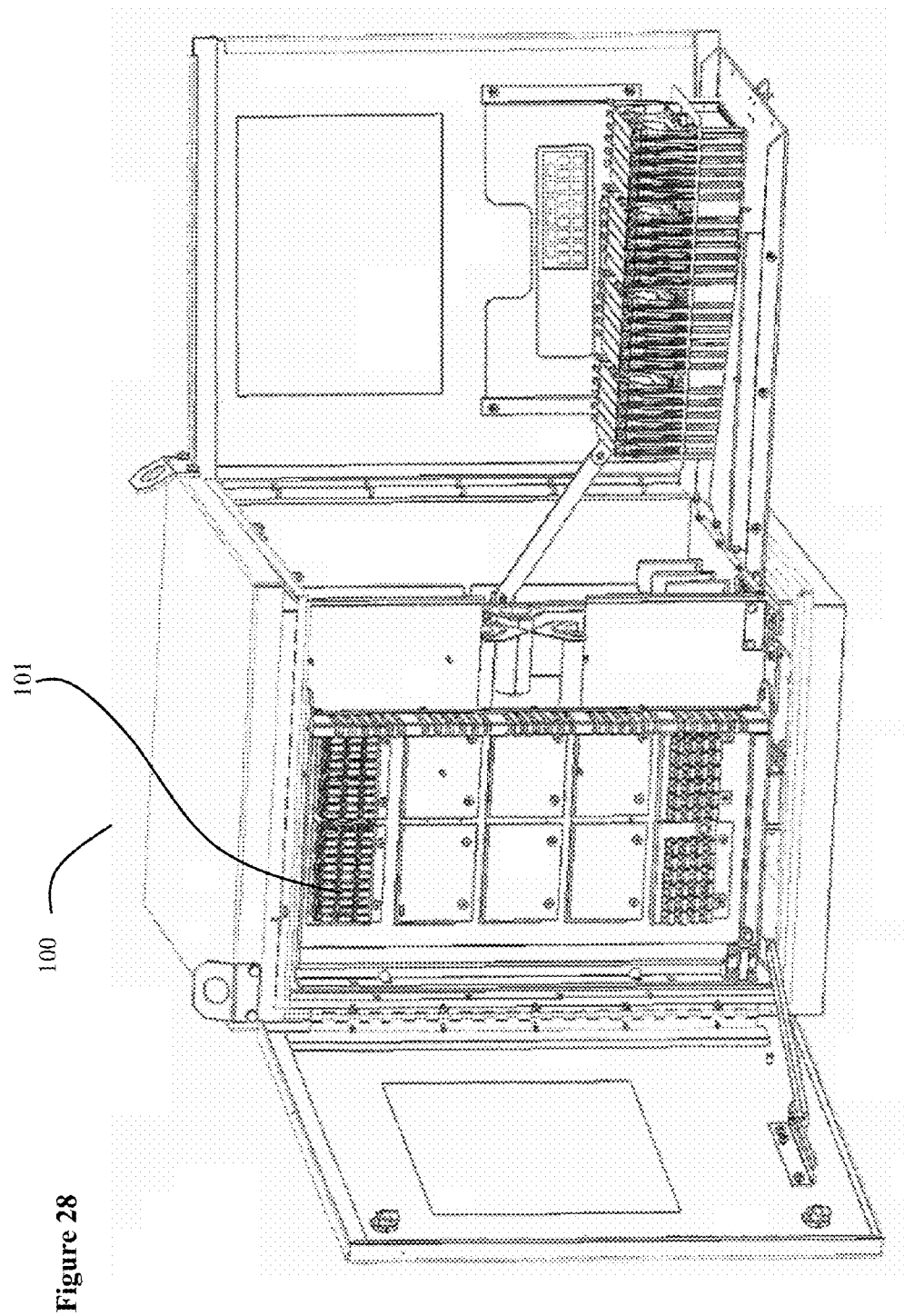
FIGS. 28-30, 31A-31C and 32A-32C show embodiments of the invention mounted in various types of enclosures.
Figure 29:
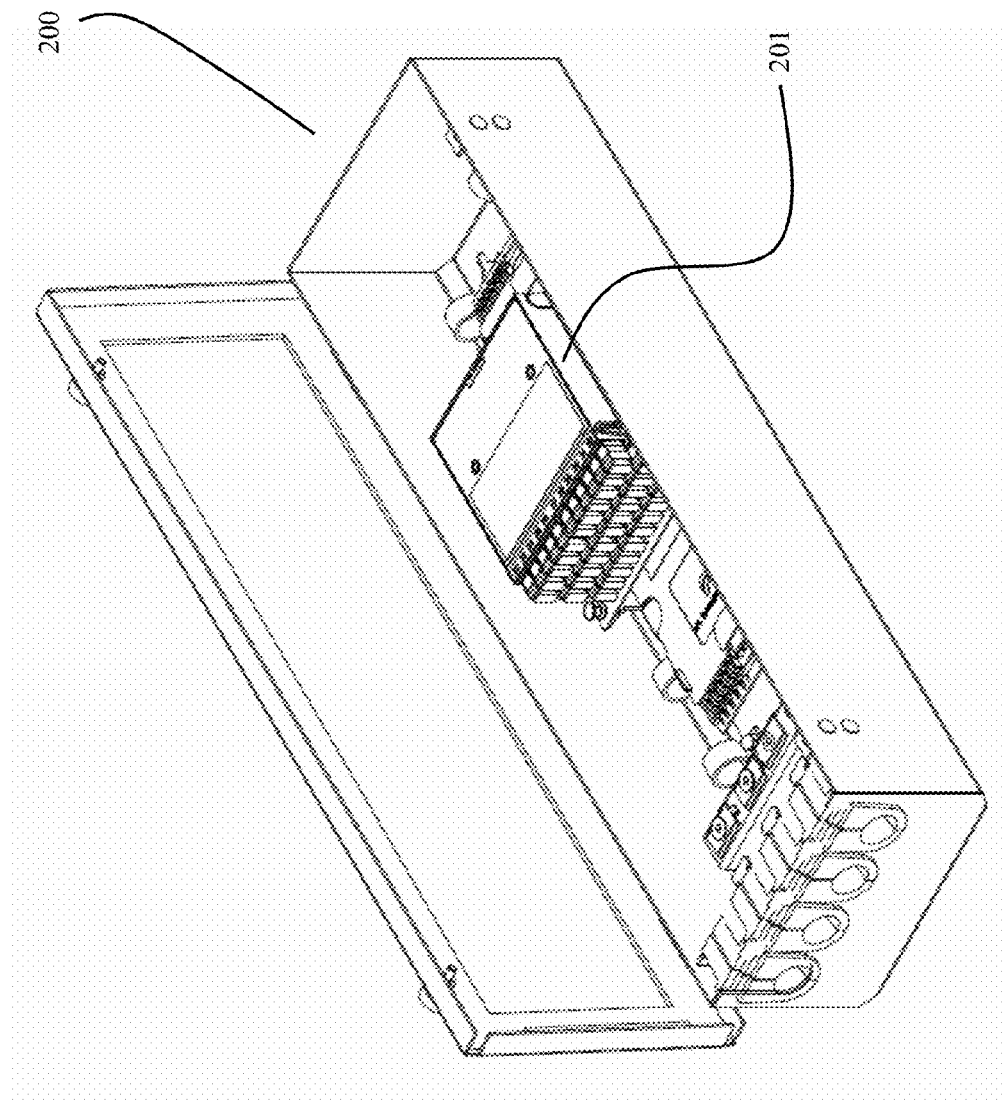
Figure 30:
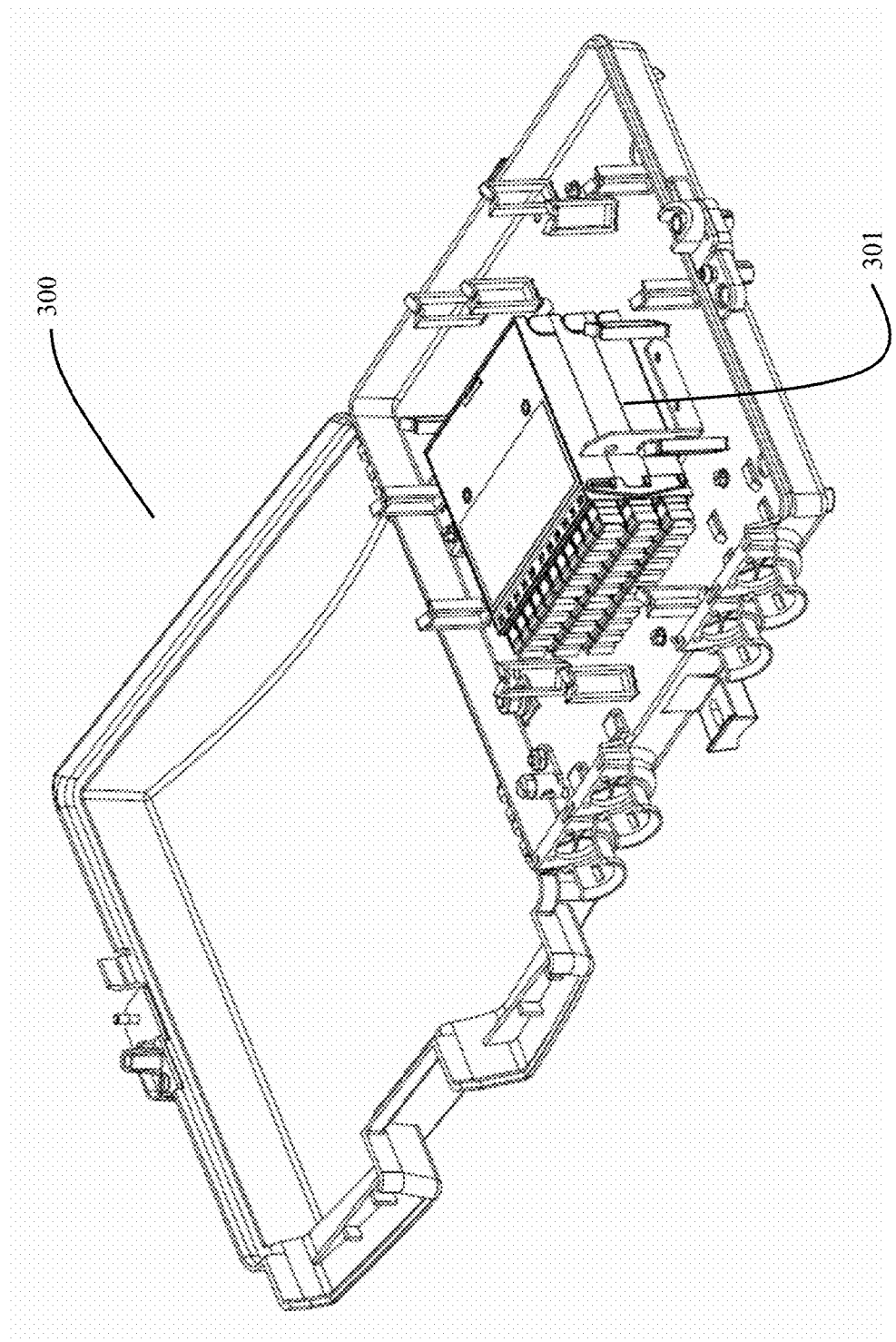
Figure 31C:
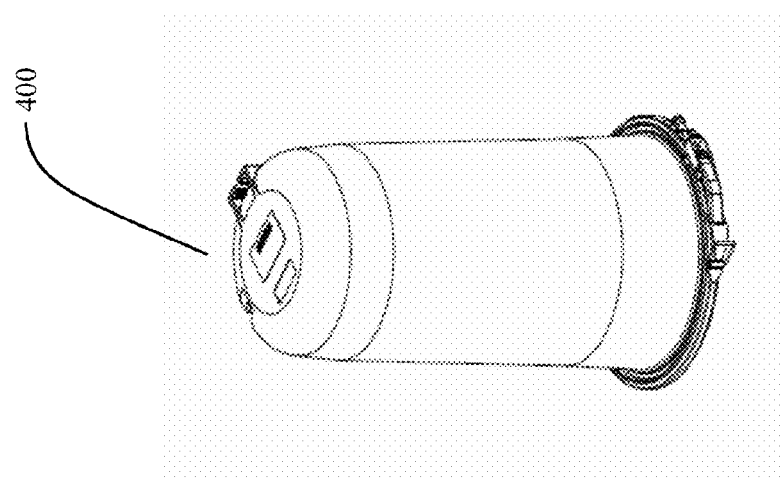
Figure 31B:
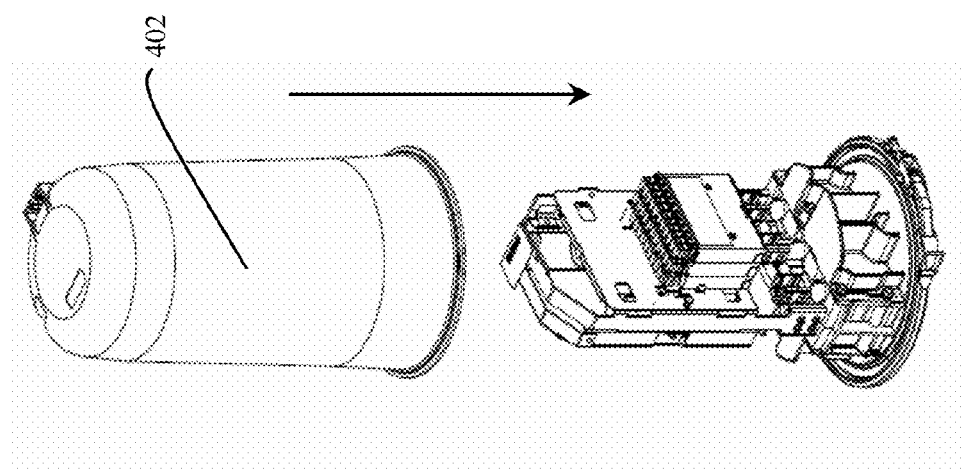
Figure 31A:
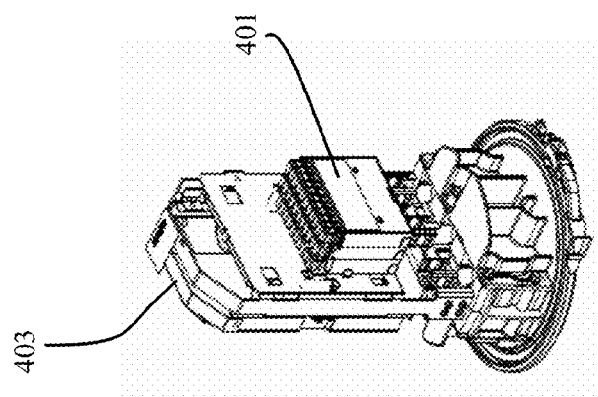
Figure 32A:
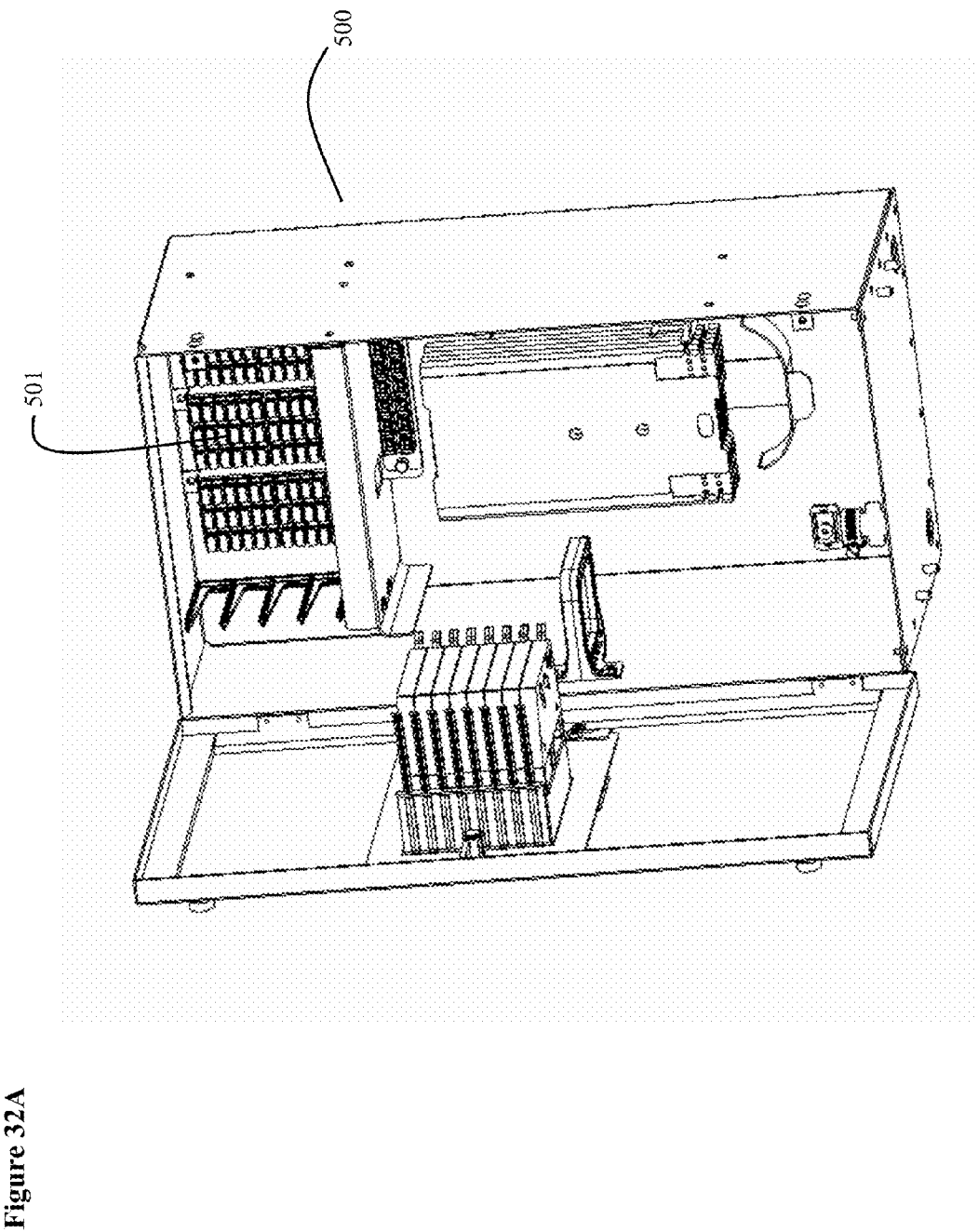
Figure 32B:
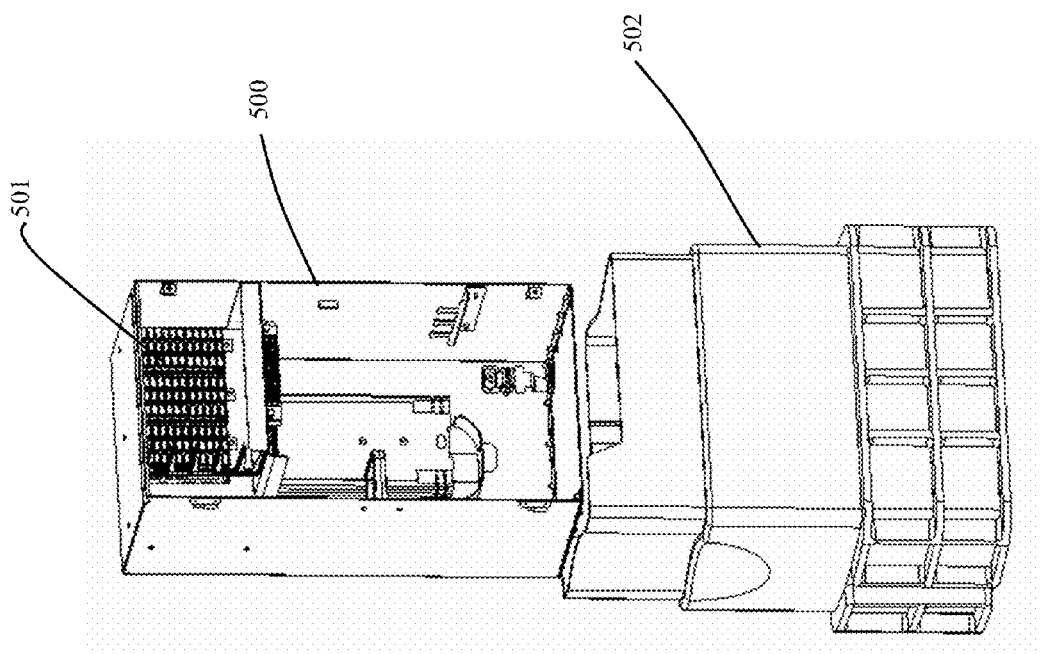
Figure 32C:
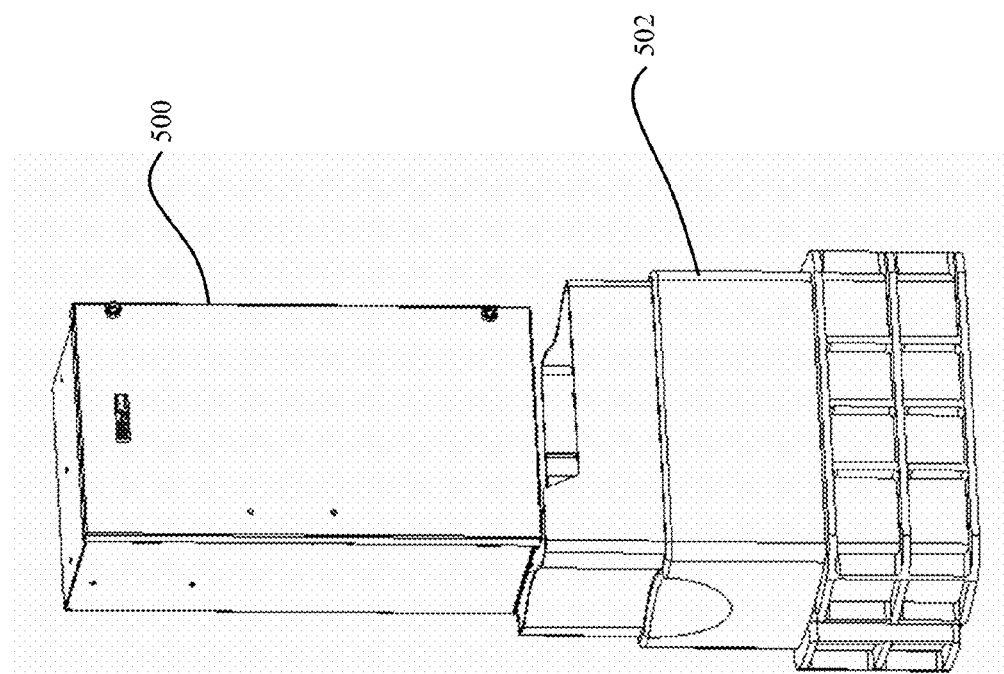

FIGS. 28-30, 31A-31C and 32A-32C show embodiments of the invention mounted in various types of enclosures. For example, FIG. 28 shows apparatus 101, which could be any of the embodiments of the apparatuses disclosed above, mounted in a large ruggedized cabinet 100. FIGS. 29 and 30 shows apparatuses 201 and 301, which could be any of the embodiments of the apparatuses disclosed above, mounted in a smaller wall mounted cabinets 200 and 300. FIGS. 31A-

31C and 32A-32C show apparatuses 401 and 501, which could be any of the embodiments of the apparatuses disclosed above, mounted in/or on pedestals 400 and 502. In the embodiment shown in FIGS. 31A-31C, the apparatus 401 is attached to a frame 403 of the pedestal and a cover 402 is placed over the frame 403. In the embodiment shown in FIGS. 32A-32C, the apparatus 501, which could be any of the embodiments of the apparatuses disclosed above, is mounted on a rack in a larger wall mounted or standalone cabinet 500. The cabinet 500 is placed on top of a pedestal 502. In addition, because of the hinge plate features, the apparatus can be mounted directly on a wall without an enclosure.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. An apparatus comprising:
a housing having a splitter compartment;
a multiple fiber adapter attached to an exterior of a front housing wall of said housing;
a multiple fiber connector connected to said multiple fiber adapter and disposed in an interior of the front housing wall of said housing;
an optical splitter in said splitter compartment of said housing;
an input fiber optically connected to said optical splitter; and
a plurality of output fibers optically connected to said optical splitter and said multiple fiber connector,
wherein the housing comprises a hinge plate corresponding to a bottom housing wall perpendicular to the front housing wall of said housing in a closed state and mounted on a hinge affixed to said housing at an intersection between the bottom housing wall and a rear housing wall opposite from the front housing wall, and
wherein the housing further comprises an inner wall provided between the e hinge plate and a top housing wall, the inner wall extending parallel with the hinge plate when the hinge plate is in the closed state.

2. An apparatus comprising:
a housing having a splitter compartment;
a multiple fiber adapter attached to an exterior of a front housing wall of said housing;
a multiple fiber connector connected to said multiple fiber adapter and disposed in an interior of the front housing wall of said housing;
an optical splitter in said splitter compartment of said housing;
an input fiber optically connected to said optical splitter; and
a plurality of output fibers optically connected to said optical splitter and said multiple fiber connector,
wherein the housing comprises a hinge plate corresponding to a bottom housing wall perpendicular to the front housing wall of said housing in a closed state and mounted on a hinge affixed to said housing at an intersection between the bottom housing wall and a rear housing wall opposite from the front housing wall, and
wherein the hinge plate comprises a plurality of mounting holes for mounting an additional apparatus having the same components as the apparatus to the apparatus or mounting the apparatus on an exterior wall.

3. The apparatus of claim 1, wherein the hinged plate comprises a stand-off protruding toward the housing, and
wherein the housing comprises a recess corresponding to the stand-off.

4. The apparatus of claim 3, wherein the stand-off is configured to be inserted into the recess.

5. The apparatus of claim 3, wherein the stand-off comprises a tab configured to engage with the recess.

6. The apparatus of claim 1, wherein the inner wall corresponds to the bottom housing wall when the hinge plate is in an open state.

\* \* \* \* \*